(12) United States Patent
Kim et al.

(10) Patent No.: US 12,349,029 B2
(45) Date of Patent: Jul. 1, 2025

(54) METHOD AND DEVICE FOR PROVIDING CONNECTIVITY TO TERMINAL IN ORDER TO USE EDGE COMPUTING SERVICE

(71) Applicant: Samsung Electronics Co., Ltd., Suwon-si (KR)

(72) Inventors: Sunghoon Kim, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 376 days.

(21) Appl. No.: 17/593,819

(22) PCT Filed: Mar. 26, 2020

(86) PCT No.: PCT/KR2020/004132
§ 371 (c)(1),
(2) Date: Sep. 24, 2021

(87) PCT Pub. No.: WO2020/197288
PCT Pub. Date: Oct. 1, 2020

(65) Prior Publication Data
US 2022/0191100 A1    Jun. 16, 2022

(30) Foreign Application Priority Data

Mar. 28, 2019 (KR) .................. 10-2019-0035781
Mar. 13, 2020 (KR) .................. 10-2020-0031207

(51) Int. Cl.
*H04L 41/0893* (2022.01)
*H04L 41/0853* (2022.01)
(Continued)

(52) U.S. Cl.
CPC .......... *H04W 4/50* (2018.02); *H04L 41/0853* (2013.01); *H04L 41/0893* (2013.01);
(Continued)

(58) Field of Classification Search
CPC . H04L 41/0893; H04L 41/0853; H04L 41/12; H04L 61/4511; H04W 4/50; H04W 60/04; H04M 15/66
(Continued)

(56) References Cited

U.S. PATENT DOCUMENTS 8,428,592 B2   4/2013   Lundqvist et al.
10,827,409 B2  11/2020  Kim et al.
(Continued)

FOREIGN PATENT DOCUMENTS

CN    108029009 A    5/2018
CN    109275160 B    1/2019
(Continued)

OTHER PUBLICATIONS

Supplementary European Search Report dated Feb. 14, 2022, in connection with European Application No. 20777883.8, 12 pages.
(Continued)

*Primary Examiner* — Chi Tang P Cheng

(57) ABSTRACT

The present disclosure relates to a communication technique for converging IoT technology with a 5th generation (5G) or pre-5G communication system for supporting a higher data transmission rate beyond a 4th generation (4G) communication system such as long term evolution (LTE), and a system therefor. The present disclosure may be applied to an intelligent service (for example, a smart home, a smart building, a smart city, a smart car or connected car, health care, digital education, retail business, a security and safety-related service, etc.) on the basis of 5G communication technology and IoT-related technology. According to various embodiments of the present invention, a method may be provided for providing DNS server or edge computing
(Continued)

service configuration server information to a terminal in order to support an operation in which the terminal discovers an edge server.

15 Claims, 8 Drawing Sheets

(51) Int. Cl.
    *H04L 41/0894*     (2022.01)
    *H04L 41/12*     (2022.01)
    *H04L 61/4511*     (2022.01)
    *H04M 15/00*     (2006.01)
    *H04W 4/50*     (2018.01)
    *H04W 60/04*     (2009.01)

(52) U.S. Cl.
    CPC .......... *H04L 41/0894* (2022.05); *H04L 41/12* (2013.01); *H04L 61/4511* (2022.05); *H04M 15/66* (2013.01); *H04W 60/04* (2013.01)

(58) Field of Classification Search
    USPC .......................................................... 370/329
    See application file for complete search history.

(56) References Cited

U.S. PATENT DOCUMENTS

| | | | |
|---|---|---|---|
| 11,444,850 | B2 | 9/2022 | Dao et al. |
| 2012/0196601 | A1 | 8/2012 | Lundqvist et al. |
| 2017/0026233 | A1 | 1/2017 | Boutros et al. |
| 2018/0139107 | A1 | 5/2018 | Senarath et al. |
| 2018/0192390 | A1 | 7/2018 | Li et al. |
| 2018/0192471 | A1 | 7/2018 | Li et al. |
| 2019/0021064 | A1 | 1/2019 | Ryu et al. |
| 2019/0026450 | A1 | 1/2019 | Egner et al. |
| 2020/0120446 | A1* | 4/2020 | Stammers ............ H04W 4/029 |
| 2020/0252837 | A1 | 8/2020 | Kim et al. |
| 2021/0320896 | A1* | 10/2021 | Feng .................... H04L 61/5007 |
| 2022/0116462 | A1* | 4/2022 | Cai ........................ H04L 67/51 |

FOREIGN PATENT DOCUMENTS

| | | |
|---|---|---|
| CN | 109417534 A | 3/2019 |
| EP | 2482525 A1 | 8/2012 |
| KR | 10-2012-0087857 A | 8/2012 |
| KR | 20180120553 A | 11/2018 |
| KR | 20190018235 A | 2/2019 |
| WO | 2018008944 A1 | 1/2018 |

OTHER PUBLICATIONS

Huawei et al., "Updates to TS 23.501, Clause 5.6.7 on Application influence on traffic routing," S2-171521, 3GPP TSG SA WG2 Meeting #119, Dubrovnik, Croatia, Feb. 13-17, 2017, 4 pages.
International Search Report and Written Opinion of the International Searching Authority in connection with International Application No. PCT/KR2020/004132 issued Jul. 2, 2020, 9 pages.
3rd Generation Partnership Project; Technical Specification Group Services and System Aspects; Telecommunication management; Study on management aspects of edge computing (Release 16) 3GPP TR 28.803 V0.4.0, Mar. 2019, 19 pages.
Intel, "pCR 28.803 solutions for SMF configuration", 3GPP TSG SA WG5 (Telecom Management) Meeting #123 S5-191182, Jan. 21-25, 2019, Montreal, Canada, 3 pages.
Huawei et al., "Discussion on SA2 Edge computing study", S2-1901832, 3GPP TSG SA2 Meeting #131, Santa Cruz, Tenerife, Feb. 2019, 14 pages.
"5G; System architecture for the 5G System (5GS) (3GPP TS 23.501 version 15.5.0 Release 15)", ETSI TS 123 501 V15.5.0 (Apr. 2019), Apr. 2019, 243 pages.
The First Office Action dated Mar. 18, 2024, in connection with Chinese Application No. 202080036990.8, 17 pages.
Communication pursuant to Article 94(3) EPC dated Apr. 12, 2024, in connection with European Application No. 20777883.8, 6 pages.
Office Action dated Jul. 12, 2024, in connection with Korean Application No. 10-2020-0031207, 13 pages.
The Second Office Action dated Dec. 19, 2024, in connection with Chinese Application No. 202080036990.8, 14 pages.
Decision of Patent dated Feb. 25, 2025, in connection with Korean Application No. 10-2020-0031207, 4 pages.
Notification of the Decison to Grant a Patent Right for Patent Invention dated Apr. 23, 2025, in connection wih Chinese Application No. 202080036990.8, 9 pages.

\* cited by examiner

METHOD AND DEVICE FOR PROVIDING CONNECTIVITY TO TERMINAL IN ORDER TO USE EDGE COMPUTING SERVICE

CROSS-REFERENCE TO RELATED APPLICATIONS

This application is a 371 National Stage of International Application No. PCT/KR2020/004132 filed Mar. 26, 2020, which claims priority to Korean Patent Application No. 10-2019-0035781 filed Mar. 28, 2019, and Korean Patent Application No. 10-2020-0031207 filed Mar. 13, 2020, the disclosures of which are herein incorporated by reference in their entirety.

BACKGROUND

1. Field

The disclosure relates to a communication system, and a method of providing DNS server or edge computing service configuration server information to a terminal in order to support an operation of discovering an edge server by the terminal.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The 5G system is considering supports for more various services as compared to the conventional 4G system. For example, the most representative service may include a ultrawide band mobile communication service (enhanced mobile broad band (eMBB)), a ultrahigh reliable/low latency communication service (ultra-reliable and low latency communication (URLLC)), a massive device-to-device communication service (massive machine type communication (mMTC)), and a next-generation broadcast service (evolved multimedia broadcast/multicast service (eMBMS)). A system providing the URLLC service may be referred to as a URLLC system, and a system providing the eMBB service may be referred to as an eMBB system. The terms "service" and "system" may be interchangeably used.

Among these services, the URLLC service that is a new service under consideration in the 5G system in contrast to the existing 4G system requires to meet ultrahigh reliability (e.g., packet error rate of about 10-5) and low latency (e.g., about 0.5 msec) conditions as compared to the other services. To meet these strict conditions required therefor, the URLLC service may need to apply a shorter transmission time interval (TTI) than the eMBB service, and various operating scheme employing the same are now under consideration.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

SUMMARY

A terminal should access an edge server in order to use an edge computing service. However, the edge server may be disposed in each area, and accordingly, the terminal is required to know an edge service which the terminal should access in the corresponding area. To this end, the terminal should be able to access a DNS server or a configuration server operated by a service provider that provides an edge computing service. Thereafter, the terminal may acquire an address of the edge server to be accessed by the terminal from the corresponding server, access the edge server, and use the edge computing service. Accordingly, the disclosure proposes a method of providing server information informing the terminal of an edge server which the terminal should access.

The technical subjects pursued in the disclosure may not be limited to the above mentioned technical subjects, and other technical subjects which are not mentioned may be clearly understood, through the following descriptions, by those skilled in the art to which the disclosure pertains.

A method of communication by a terminal according to an embodiment of the disclosure to solve the problem includes: transmitting a first message including information to request using an edge computing service to a Session Management Function (SMF); and receiving a second message including information on a configuration server for receiving configuration information for the edge computing service from the SMF, wherein the information on the configuration server is configured by a Policy and Charging Function (PCF), based on the information to request using the edge computing service.

The first message may be a PDU session establishment message or a PDU session modification request message.

The information on the configuration server may be received through Protocol Configuration Options (PCO).

The information on the configuration server may include information on the configuration server determined based on at least one piece of information on a location of the terminal and information on loads of configuration servers.

A method of communication by an SMF according to an embodiment of the disclosure to solve the problem includes: receiving a first message including information to request using an edge computing service of a terminal from the terminal; transmitting a second message for configuring a policy including the information to request using the edge computing service to a Policy and Charging Function (PCF); receiving a third message including information on a configuration server for receiving configuration information for the edge computing service configured based on the information to request using the edge computing service from the PCF; and transmitting a fourth message including the information on the configuration server to the terminal.

The fourth message may include Protocol Configuration Options (PCO) including the information on the configuration server.

In order to solve the problem, a terminal according to an embodiment of the disclosure includes: a transceiver; and a controller configured to transmit a first message including information to request using an edge computing service to a Session Management Function (SMF) and receive a second message including information on a configuration server for receiving configuration information for the edge computing service from the SMF, wherein the information on the configuration server is configured by a Policy and Charging Function (PCF), based on the information to request using the edge computing service.

An SMF according to an embodiment of the disclosure to solve the problem includes: a transceiver; and a controller configured to receive a first message including information to request using an edge computing service of a terminal from the terminal, transmit a second message for configuring a policy including the information to request using the edge computing service to a Policy and Charging Function (PCF), receive a third message including information on a configuration server for receiving configuration information for the edge computing service configured based on the information to request using the edge computing service from the PCF, and transmit a fourth message including the information on the configuration server to the terminal.

According to an embodiment of the disclosure, the terminal may acquire information on a server capable of receiving information on a server which the terminal may initially accesses to receive an edge computing service. Accordingly, the terminal may discover an edge server which the terminal should access through communication with the corresponding server and use an edge computing service through the edge server. Further, the terminal can receive the information through a connection of a mobile communication system, and thus can receive the corresponding information without any operation of an additional application layer. That is, information on the server may be acquired through establishment of a data connection to a mobile communication system or a basic operation of exchanging policy information by access to a mobile communication system. Further, a mobile communication service provider may provide corresponding information only to a terminal allowed to use the edge computing service. In addition, the terminal may receive information on a server suitable for the current location of the terminal according to a function of detecting the location of the terminal that is a basic function of the mobile communication system. Alternatively, the terminal may receive information on a server according to a PLMN which the terminal should access.

Advantageous effects obtainable from the disclosure may not be limited to the above mentioned effects, and other effects which are not mentioned may be clearly understood, through the following descriptions, by those skilled in the art to which the disclosure pertains.

BRIEF DESCRIPTION OF DRAWINGS

FIG. 2 illustrates a structure of an edge application server within an edge server which provides an edge computing service, an enabling function which enables an edge computing service, a platform, or orchestration function for an edge computing system.

DETAILED DESCRIPTION

Figure 1:
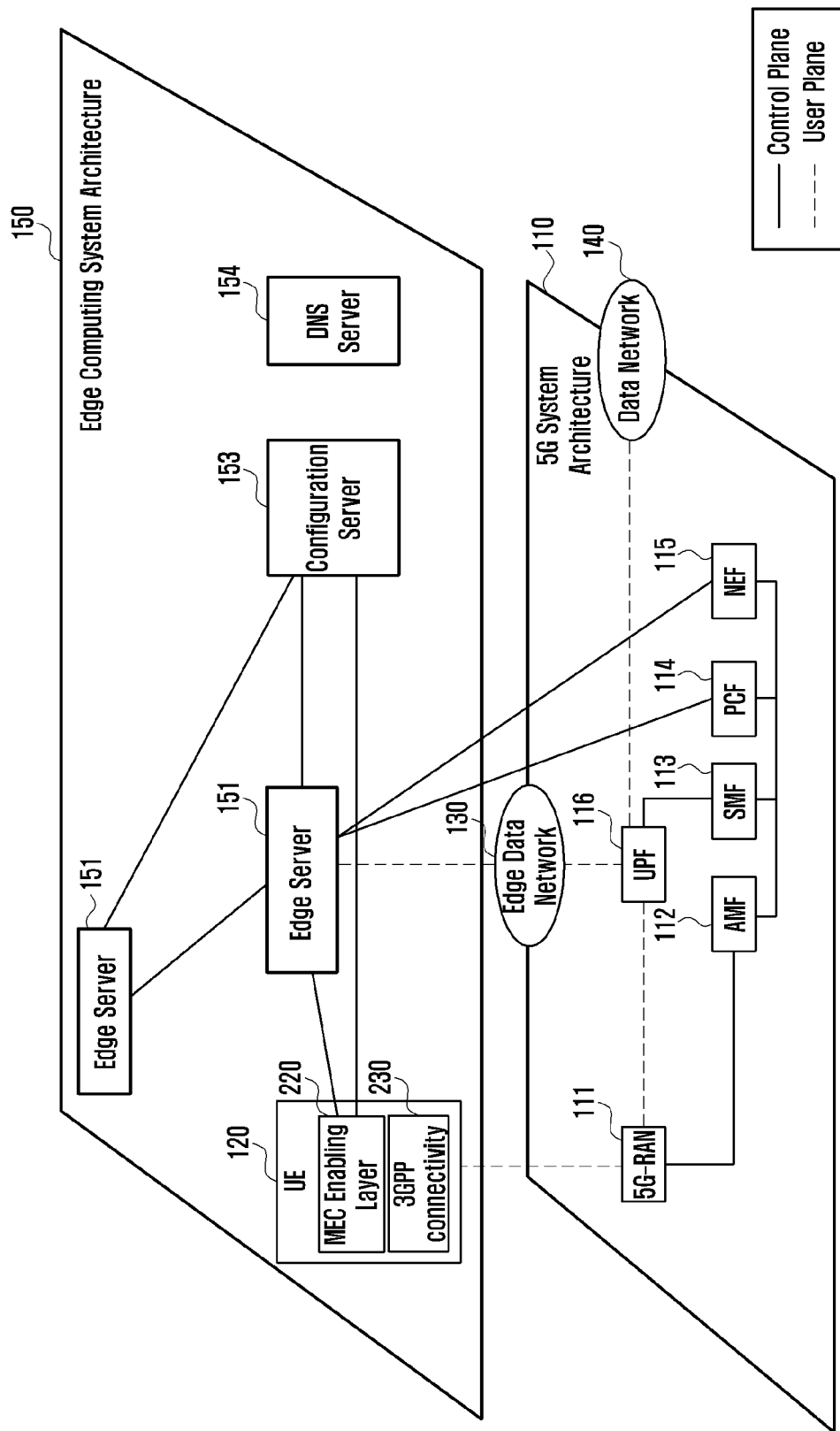
FIG. 1 illustrates a system architecture providing an edge computing service, a system architecture of a 5G mobile communication system, and a relationship therebetween according to an embodiment of the disclosure.

Hereinafter, exemplary embodiments of the disclosure will be described in detail with reference to the accompanying drawings. It should be noted that, in the drawings, the same or like elements are designated by the same or like reference signs as much as possible. Further, a detailed description of known functions or configurations that may make the subject matter of the disclosure unclear will be omitted.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

In a 3GPP next-generation communication system, continuous discussion of architecture for implementing an edge computing service is taking place. An edge computing technology may be called mobile edge computing or multi-access edge computing, and is referred to as MEC in the disclosure for convenience. MEC is a technology of installing a radio base station or a gateway (or UFP) close to the radio base station, applying a distributed cloud computing technology thereon to making various services and caching content located close to a user terminal, thereby mitigating congestion of a mobile core network, achieving low latency communication in data communication with a terminal (UE: user equipment), and creating a new service on the basis thereof. An MEC system provides a cloud computing capability and an IT service environment to an application developer or a content provider in an mobile network edge. Particularly, the MEC system may provide a ultra-low latency and high capacity bandwidth to applications to enable real time network information access. Accordingly, applications providing an MEC service may provide the service to the terminal through a 5G system. Further, the 5G system may provide a function through which the terminal using the MEC service accesses the MEC system. Not only the 5G system but also a 4G system may provide the function for the MEC service.

For convenience of the description, some of the terms and names defined in the 3rd generation partnership project long term evolution (3GPP LTE) standard can be used. However, the disclosure is not limited to the terms and names, and may be equally applied to a system following another standard.

FIG. 1 illustrates an MEC system structure, a 5G mobile communication system structure, and a correlation therebetween according to an embodiment of the disclosure.

Network entities or network nodes illustrated in FIG. 1 are described below.

A core network 110 of the 5G may include the following network functions. An Access and mobility Management Function (AMF) 112 is a network function of managing mobility of the UE 120. A Session Management Function (SMF) 113 is a network function of managing a packet data network connection provided to the UE 120. The connection is called a Protocol Data Unit (PDU) session. A Policy and Charging Function (PCF) 114 is a network function of applying a service policy and a charging policy of a mobile communication service provider and a policy for a PDU session to the UE 120. UDM (not shown) is abbreviations of Unified Data Management and is a network function of storing information on a subscriber. A Network Exposure Function (NEF) 115 may access information for managing the UE in the 5G network and subscribe to a mobility management event of the corresponding UE 120 to subscribe to a session management event of the corresponding UE 120, configure charging information of the corresponding UE 120, make a request for changing a PDU session policy for the corresponding UE 120, and transmit small data to the corresponding UE 120. A 5G-RAN 111 is a base station which provides a wireless communication function to the UE 120. The UPF 116 is abbreviations of User Plane Function and serves as a gateway which transmits a packet transmitted and received by the UE 120. The UFP 116 may be located close to an edge server 151 to support MEC, and accordingly achieve low-latency transmission by directly transmitting a data packet to an edge network 130. The UPF 116 may be connected to a data network 140 connected through the Internet and route data, which should be transmitted through the Internet among packets transmitted by the UE 120, an Internet data network 140.

An MEC system structure 150 may include the UE 120, the edge server 151, and a configuration server 153. The UE 120 supporting the MEC system 150 may include an MEC enabling layer 220 within the UE 120 and a detailed structure is described with reference to FIG. 2. The edge server 151 is a server which the UE 120 accesses to use the MEC service, and a 3rd party application server is driven in the edge server 151. A detailed structure thereof is described with reference to FIG. 2. In order to indicate the terms of the edge server 151, an edge computing server, an MEC server, an MEC server, an MEC server, a multi-access edge host, an edge computing platform, MEC cloudlets, and an edge hosting environment may be interchangeably used but are not limited thereto. The configuration server 153 performs a function of transmitting configuration information to use the MEC service to the UE 120. The configuration server 153 is aware of deployment for each location of eh edge server 151. Before using the MEC service, the UE 120 may access the configuration server 153 and receive configuration information required to use the MEC service (for example, information on the edge server to be accessed at a specific location). The configuration information 153 may be called an edge enabling configuration function or an edge data network configuration server but is not limited thereto, and may correspond to any access server capable of providing configuration information the UE 120 to use the MEC service.

Further, there is a DNS server 154 for the MEC service. The DNS server 154 may be used to resolve an IP address of the edge server 151 or resolve an IP address of an application server driven on the edge server 151. That is, the DNS server 154 may be a network function which knows information on the edge server 151 or information on the application server driven on the edge server. The DNS server 154 may exist in every edge network covering a specific area or one DNS server may exist in the entire MEC system. When the DNS server 154 for MEC exists in every edge network covering a specific area, the UE 120 should know information on the DNS server 154 for the corresponding location, which may operate according to an embodiment of the disclosure. When only one DNS server 154 for MEC exists in the entire MEC system, the DNS server 154 should know information on the edge server installed in the entire network and information on application servers which can be provided in the MEC system, and the information may be provided to the DNS server 154 by an orchestration system.

The UE 120 may access the 5G system 110 through the 5G base station 111 and establish a data connection. In order to provide the MEC service to the UE 120, the 5G system 110 may allocate the UPF 116 for access to the corresponding edge network 150 and the UE 120 may communicate with the edge server 151 through the UPF 116 and communicate with a 3rd application server driven in the edge server 151. The edge server 151 may negotiate with the PCF 114 or the NEF 115 of the 3GPP network. Through the negotiation, the edge server 151 may provide information required by the UE 120 to use the MEC service to the 5G mobile communication system 110 through the PCF 114 or the NEF 115, or the edge server 151 may use an exposure function (for example, reporting a location of the UE 120, reporting a session-related event of the UE 120, or the like) which the NEF 115 of the 5G mobile communication system provides to an external server.

Figure 2:
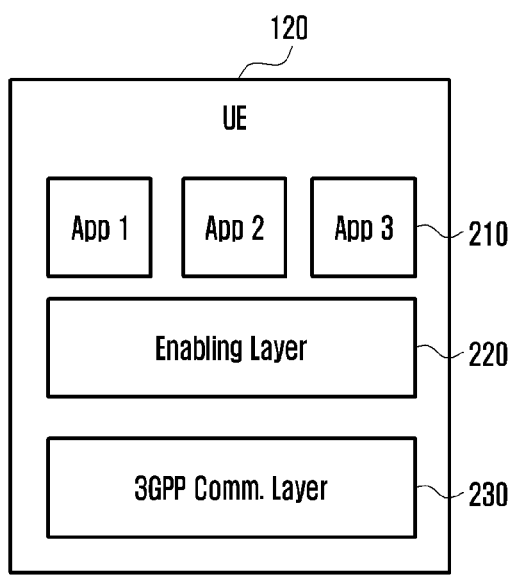
FIG. 2 illustrates a structure of an application within the terminal, an enabling layer which enables an edge computing service, and a communication layer accessing a mobile communication system according to an embodiment of the disclosure. Further.
Figure 2:
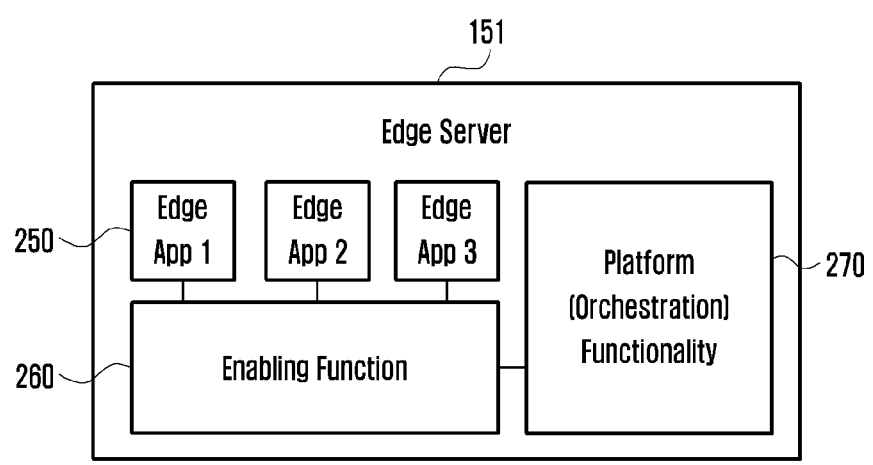

FIG. 2 illustrates a structure of an enabling layer which enables an MEC service with an application within the UE and a communication layer accessing a mobile communication system according to an embodiment of the disclosure. Further, FIG. 2 illustrates a structure of an edge application server within an edge server which provides an edge computing service, an enabling function which enables an edge computing service, and a platform or orchestration function for an edge computing system.

Referring to FIG. 2, an application 210 of the UE 120 is an application provided by a 3rd party. That is, the application 210 is a client application program executed within the UE 120 for a specific application service. The application 210 may be called client apps (application), a UE application, an application client, or the like, but is not limited thereto, and may correspond to any client application program executed within the UE 120. A plurality of applications 210 may be executed within the UE 120. At least one of the applications 210 may use the MEC service. The enabling layer 220 within the UE 120 is a layer for performing the operation within the UE 120 to use the MEC service. The enabling layer 220 may be called an enabler client, an MEC activation (enabling) layer, an MEC Enabling Layer (MEL), an enablement layer, an MEC layer, a multi-access edge enabling layer, a UE enabling client, an edge enabler client, or the like, but is not limited thereto, and may correspond to any layer/client performing the operation within the UE 120 to use the MEC service within the UE 120. The enabling layer 220 may determine which application 210 can use the MEC service, and perform an operation of connecting a network interface to an application server providing the MEC service to transmit data of the UE client application program. Further, the enabling layer 220 may perform an operation for establishing a data connection to use the MEC service with a 3GPP communication layer. The 3GPP communication layer (3GPP Comm. Layer) 230 is a layer performing a modem operation for using a mobile communication system, and serve to establish a wireless connection for data communication, register the UE 120 in the mobile communication system, establish a connection for data transmission in the mobile communication system, and transmit and receive data.

FIG. 2 illustrates an edge application server 250 (Edge App 1, Edge App 2, and Edge App 3) which is an application server provided by a 3rd party within the edge server 151 providing the MEC service, an enabling function 260 which enables the MEC service to the corresponding edge application server 250, and a platform or an orchestration function 270 for an edge computing system. The edge application server 250 is an application server provided by a 3rd party, and corresponds to a server which a 3rd party client application of the UE 120 accesses to use a service. The edge application server 250 may be called an MEC app, a multi-access edge application, an edge application server, an edge application, or the like, but is not limited thereto, and may correspond to any application server provided by a 3rd party within the edge server 151. The enabling function 260 may perform a function of managing information on the edge application servers 250, and may serve to identify which edge application is being executed in the current edge network and manage a Fully Qualified Domain Name (FQDN) or an Internet Protocol (IP) address required for transmitting data to the corresponding edge application server 250 to inform the enabling layer 220 of the UE 120 of the same. Further, the enabling function 260 may serve as a proxy to allow the edge application server 250 to use an exposure function provided by the 3GPP network 110, that is, the NEF 115 of the 5G mobile communication system (a mobility-related event of the UE 120, a session-related event, a traffic path change event of the UE 120, or the like). That is, according to a request from the edge application server 250, the enabling function 260 may allow the call of the exposure service provided by the NEF 115 of the 5G mobile communication system and the use of the required network exposure function. The enabling function 260 may be called an MEC enabling layer, an edge enabling server function, an MEC enabling layer server, a multi-access enabling layer, an edge enabler server, or the like, but is not limited thereto, and may correspond to any function for performing a function of allowing the edge application server 250 to enable the MEC service. The platform functionality 270 may be a platform function of the system to which the edge servers 151 included in the edge network 150 are connected or may be an orchestration function. The platform function or the orchestration function may include a middleware application or an infrastructure service for configuring an MEC system structure. That is, the platform functionality 270 may deploy or distribute the edge servers 151 included in the edge network 150, perform an operation of injecting an edge application package to the edge server 151 or executing the edge application server 250 in the edge server 151, or perform a function of configuring information of the edge application server 250 (for example, an IP address and an FQDN) in the edge server 151. Further, the platform functionality 270 may support a function of providing a platform service (for example, a report on a network condition, a request for changing a traffic path of the UE 120, a report on location information of the UE 120, or the like) provided using the 5G system to the edge application server 250. The platform functionality 270 may be called a multi-access edge platform, an edge computing infra, or the like, but is not limited thereto, and may correspond to any function performing a platform function of the system to which edge servers included in the edge network are connected.

Figure 3:
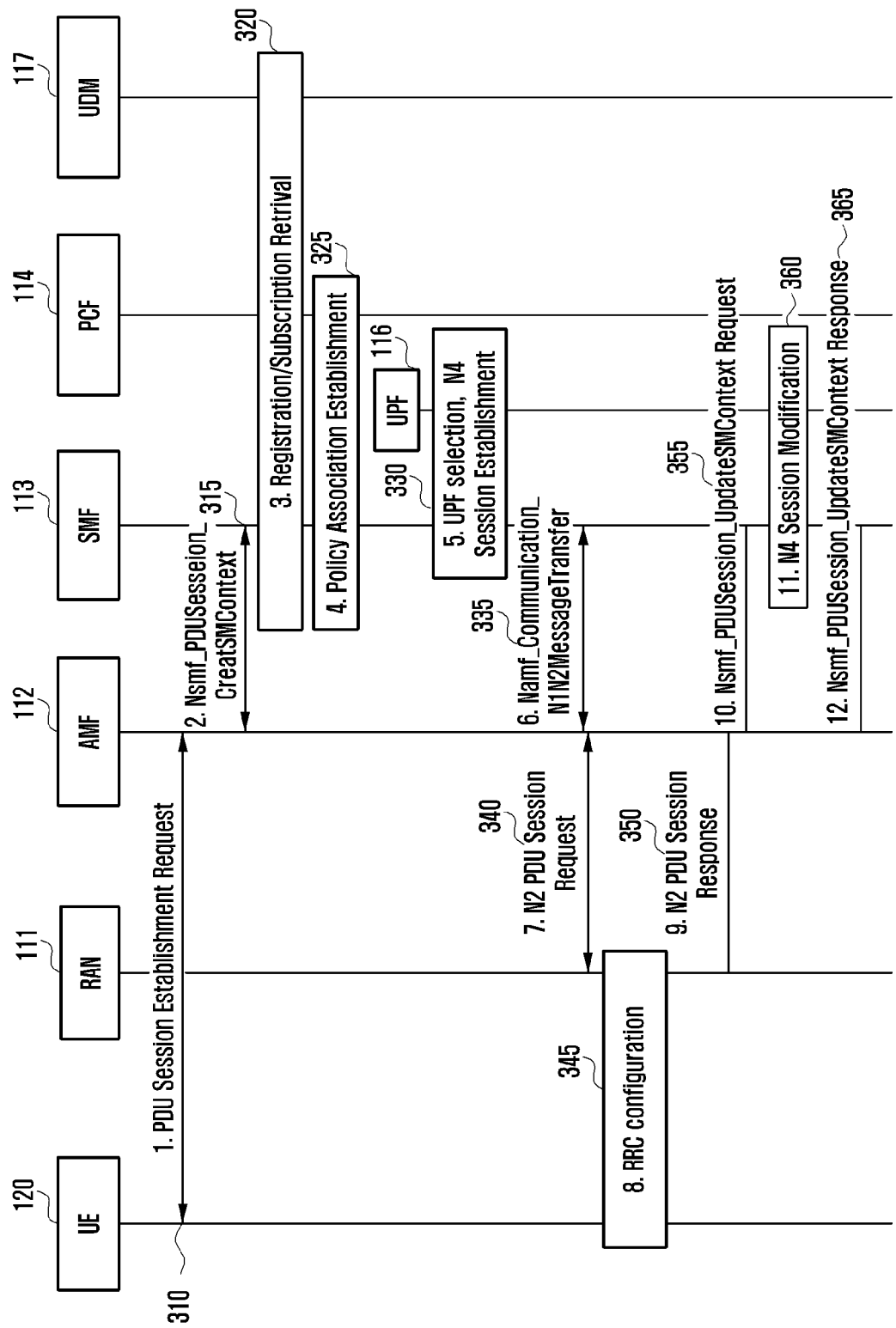
FIG. 3 illustrates a procedure in which the terminal establishes a data connection through access to a 5G mobile communication system according to an embodiment of the disclosure. The terminal may receive information on a server should be initially accessed through the procedure.

FIG. 3 illustrates a PDU Session establishment operation in which the UE accesses the 5G system to establish a data connection according to an embodiment of the disclosure. The UE may receive information on a server which should be initially accessed through the procedure.

According to an embodiment of the disclosure, through the procedure of FIG. 3, a method by which the UE 120 acquires DNS server information for discovering the edge server 151 which the UE 120 should access to use the MEC service from the 5G system is proposed. The DNS server 154 may be used to resolve an IP address of the edge server 151 or resolve an IP address of an application server driven on the edge server. That is, the DNS server 154 may be a network function which knows information on the edge server 151 or information on the application server driven on the edge server. The DNS server 154 may exist in every edge network covering a specific area or one DNS server may exist in the entire MEC system.

In another example, through the procedure of FIG. 3, a method by which the UE 120 acquires an address (for example, an IP address or an FQDN) of the initial access server 153 from which the UE 120 can receive configuration information to use the MEC service from the 5G system is proposed. The initial access server 153 is a server which provides configuration information for using the MEC service by the UE 120 and is referred to as an MEC configuration server. The MEC configuration server 153 performs a function of transmitting configuration information to use the MEC service to the UE 120. The configuration server 153 is aware of deployment for each location of the edge server 151. Before using the MEC service, the UE 120 may access the configuration server 153 and receive configuration information required to use the MEC service, for example, information on the edge server 151 to be accessed at a specific location.

At least one of the embodiment in which 1) an address of the DNS server 154 and the embodiment in which 2) an address of the MEC configuration server 153 is configured may be applied to the operations of FIG. 3.

In operation 310, the terminal (UE) 120 may configure a PDU session establishment request corresponding to an SM NAS message and transmit the same to the AMF 112 (through the RAN 111) in order to establish a PDU session. The UE 120 may insert a Data Network Name (DNN) which the UE desires to use into the PDU session establishment message, transmit the PDU session establishment message to the AMF 112, and configure the DNN to have a DNN value for MEC. Alternatively, a default DNN which the UE 120 should use in the 5G system may be a DNN which can use MEC. DNN information may be used when the SMF 113 or the PCF 114 determines whether the corresponding DNN is a DNN for MEC allowed to be used by the UE 120. The DNN value for MEC may be based on a value preset in the UE 120. Alternatively, the UE 120 may include an indicator indicating that a PDU session which the UE requests in the PDU session establishment message is a PDU session to use the MEC service. When a mobile communication service provider uses a general DNN, for example, an Internet DNN for the MEC service, if the UE 120 makes a request for the PDU session through the Internet DNN, it cannot be determined whether the corresponding PDU session is the PDU session to use MEC, and thus the indicator may be inserted into the message by the UE 120 and transmitted to the AMF 112. The indicator may include the meaning indicating that it is required to apply session policy for the MEC service to the corresponding PDU session. Alternatively, the indicator may indicate an ID of a service provider which provides the MEC service, which may be used in the form of an AF service identifier within the 5G system. The AF service identifier may be information pre-configured in an MEC service-supporting function within the UE or information included in configuration information for the MEC service within the UE. The above-described indicator may be used to determine the application of the MEC service to the corresponding PDU session by the SMF 113 or the PCF 114 in the following operation.

In operation 315, the AMF 112 may select the SMF 113 on the basis of the DNN value or the location of the UE 120 and transmit an Nsmf_PDUSession_CreateSMContext request message to the selected SMF 113. The AMF 112 inserts a PDU session establishment request message received from the UE 120 into the message.

In order to acquire session-related subscription information for the corresponding UE 120 on the basis of the PDU session establishment request message received from the UE 120, the SMF 113 may perform a procedure of performing registration indicating that the SMF 113 is a serving SMF in the UDM 117 and a procedure of acquiring subscription information for managing a session of the corresponding UE 120 in operation 320.

As an optional operation, when the PDU session establishment request message received from the UE 120 in operation 310 includes the DNN for MEC, the SMF 113 may insert an indicator making a request for subscription information for the MEC service into a message transmitted to the UDM 117 in order to acquire subscription information for the MEC DNN during the operation in which the UDM 117 acquires subscription information. Alternatively, when an indicator indicating that the UE 120 desires to use the MEC service is included in operation 310, the SMF 113 may insert an indicator making a request for subscription information for the MEC service into the message transmitted to the UDM 117 on the basis of the indicator. The indicator may be an identifier indicating data for the MEC service in the subscription information. The UDM 117 receiving the message may provide subscription information for the MEC service to the SMF 113. The subscription information may include authorization information indicating whether the UE 120 can use the MEC service, information on an area in which the UE 120 can use the MEC service, information on a DNS server which the UE 120 should use, information on the MEC configuration server from which the UE 120 should initially access to receive configuration information, an AF service identifier indicating an MEC service provider ID used by the UE, and the like.

In operation 325, the SMF 113 may perform an SM policy association establishment procedure with the PCF 114 for the corresponding DNN on the basis of the PDU session establishment request message received from the UE 120. At this time, the SMF 113 may transmit the DNN requested by the UE 120 to the PCF 114. The PCF 114 receiving the information may determine that the corresponding DNN is a DNN for the MEC service and then configure a session-related policy to be transmitted to the SMF 113 to include information for using the MEC service. Alternatively, when the corresponding PDU session establishment request includes the indicator for using the MEC service in operation 310, the UE 120 may perform an SM policy association establishment procedure including the indicator that the corresponding PDU session is to use the MEC service to the PCF 114, and the PFC 114 receiving the indicator may configure a session-related policy to be transmitted to the SMF 113 to include information for using the MEC service. In another detailed example, the indicator may be in the form of an AF service identifier indicating an ID of an MEC service provider. This may be an indicator received from the UE or an indicator acquired from subscription information of the UE. Further, when performing the SM policy association establishment procedure in the PCF 114, the SMF 113 may include information on the current location of the UE 120 (for example, a cell ID, a tracking area, or the like) to inform the PCF 114 of the same. When transmitting MEC-related information to the SMF 113 for the PDU session of the corresponding UE 120 thereafter, the PCF 114 may determine which information should be known on the basis of the location information of the UE 120.

According to an operational operation in operation 320, the SMF 113 may identify whether the corresponding UE 120 and the DNN requested by the corresponding UE 120 are allowed to use the MEC service on the basis of subscription information of the UE 120. When the UE 102 is a UE allowed to use the MEC service or when the DNN requested by the UE 120 is a DNN allowed to use the MEC service, the SMF 113 may transmit an indicator indicating allowance of the use of the MEC service, an indicator indicating a DNN to use the MEC service, or an AF service identifier indicating an MEC service provider ID to the PCF 114 during policy association with the PCF 114. The PCF 114 may configure MEC service-related information for the corresponding UE on the basis thereof and transmit the same to the SMF 113. Alternatively, after determining that the DNN included in the corresponding request is a DNN used for the MEC service for the policy association requested by the SMF, the PCF may determine to configure MEC service-related information for the corresponding UE.

The PCF 114 may insert information for the MEC service into the session-related policy information which should be provided to the SMF 113 through the above procedure. The PCF 114 may determine whether to provide the information for the MEC service on the basis of user information stored in a Unified Data Repository (UDR). At this time, it may be determined whether to provide the information on the corresponding MEC service in consideration of a used MEC service provider. The information for the MEC service may be a DNS server address that should be accessed when the UE 120 uses the MEC service through the corresponding PDU session. In another example, the information for the MEC service may be an address of an initial access server, that is, an MEC configuration server that should be accessed to receive relevant configuration information when the UE 120 uses the MEC service through the corresponding PDU session. The address of the DNS server 154 or the address of the MEC configuration server 153 may follow a format of the IP address. Alternatively, the address of the configuration server 153 may follow an FQDN format, in which case the UE 120 may acquire the IP address of the MEC configuration server 153 through a DNS query when receiving the FQDN in the following operation. When the PCF 114 determines an MEC service on which information should be provided for the corresponding PDU session, the PCF 114 may inform the SMF 113 of an address of the DNS server 154 or an address of the MEC configuration server 153 which is the closest to the current location of the UE 120 in consideration of the location of the UE 120 received from the SMF 113. In another example, when the PCF 114 determines an address of the DNS server 154 or an address of the MEC configuration server 153 which can be accessed and used at the current location of the UE 120, the PCF 114 may select information on a server which is the closest to the current location of the UE (which can be used at the current location of the UE 120) among the DNS server 154 or the MEC configuration server 153 having small load in consideration of a load state of the network and provide the selected server information to the SMF 113.

According to an embodiment, in order to update the address of the DNS server 154 or the address of the MEC configuration server 153 suitable for the location of the UE 120, the PCF 114 may subscribe to an event for a change in the location of the UE 120 in the SMF 113. When the PCF 114 subscribes the location change event of the UE 120 in the SMF 113, the PCF 114 may configure and make a request for an Area of Interest (AoI) (an area in which mobility of the UE 120 should be determined), which may be configured in the form of a tracking area list or a cell list. When determining the Area of Interest (AoI), he PCF 114 may make a decision in consideration of information on an area covered by the edge network 150 which can be used in the current area of the UE 120. For example, when the UE 120 escapes a specific area corresponding to the AoI, the PCF 114 may configure a report on an event in the SMF 113 and, when receiving an event report from the SMF 113, may determine the location of the UE 120 again and update the address of the DNS server 154 or the address of the MEC configuration server 153 therefor in the SMF 113.

When providing the address of the DNS server 154 or the address of the MEC configuration server 153, the PCF 114 may configure mapping indicating server information that should be used and an area in which the server information should be used and transmit the same to the SMF 113. For example, the PCF may configure the address of the DNS server 154 or the address of the MEC configuration server 153 which should be accessed in Tracking Area 1, Tracking Area 2, Tracking Area 3, and Tracking Area 4, and the address of the DNS server 154 or the address of the MEC configuration server 153 which should be accessed in Tracking Area 10, Tracking Area 11, and Tracking Area 12 in the form of a list and transmit the list to the SMF 113. The SMF 113 receiving the information may determine mobility of the UE 120 in the future and determine to update the address of the DNS server 154 or the address of the MEC configuration server 153 which should be accessed in an area in which the UE 120 is currently located to the UE 120. According to an embodiment, the SMF 113 receiving the information from the PCF 114 may configure information obtained by mapping the address of the DNS server 154 or the address of the MEC configuration server 153 to location information (for example, tracking area list) in the form of a list and determine to transmit the list to the UE 120.

According to an embodiment, the PCF 114 may also include and transmit authorization information indicating whether the UE 120 can use the MEC service, information on an area in which the UE 120 can use the MEC service (a tracking area list, a cell list, or the like), information on a period in which the UE 120 can use the MEC service (for example, one month, from what date of the month until what date of the month, or the like) as well as the above information to the SMF 113. When the SMF 113 receives the area information and the UE 120 escapes the corresponding area, the SMF 113 may determine that a PDU session using the MEC service cannot be provided to the UE 120, inform the PCF 114 of the current location of the UE 120, and make a request for a new policy or release the PDU session of the UE 120. When receiving the time information, the SMF 113 may determine that the PDU session using the MEC service cannot be provided to the UE 120 at a time point at which the corresponding time has passed, and may make a request for a new policy to the PCF 114 or release the PDU session of the UE 120.

The PCF 114 may transmit a Policy and Charging Control (PCC) rule which the SMF 113 should apply to the PDU session to be used by the UE 120. Information proposed in the embodiment may be included as a portion of the PCC rule or may be separately configured as information of the MEC service other than the PCC rule and then transmitted. When configuring the PCC rule, the PCF 114 may include a list of a traffic detection rule required for providing the MEC service in the corresponding PDU session, a traffic forwarding rule, or information for identifying the UPF 116 which should be allocated to establish the corresponding PDU session (for example, a Data Network Access Identity (DNAI)). After receiving the information, the SMF 113 may select the UPF 116 on the basis of the information and apply the information when transmitting a session establishment request to the UPF 116.

In operation 330, the SMF 113 may perform a UPF selection procedure on the basis of policy information received from the PCF 114 and perform an N4 session establishment procedure with the selected UPF 116. When the SMF 113 receives a DNAI list from the PCF 114, the SMF 113 selects the UPF 116 corresponding to a DNAI which can be connected on the basis of the current location of the UE 120. When the information received from the PCF 114 includes information on an area in which the DNN for MEC can be used, the SMF 113 selects the UPF 116 which can support the corresponding service area on the basis of the current location of the UE 120. When selecting the UPF 116, the SMF 113 may determine whether the UPF 116 is a UPF which can be connected to the edge network 150 which the PDU session requested by the UE 120 accesses, and select a UPF which can be connected to the corresponding edge network 150. Further, the SMF 113 may perform an N4 session establishment procedure including transmission of a DNAI, a packet forwarding action rule, and a packet enforcement rule to the corresponding UPF 116 such that data transmission and reception to and from the edge network 150 is possible.

In operation 335, the SMF 113 may configure a PCO to be provided to the UE 120 on the basis of session-related policy information received from the PCF 114. The PCO is the abbreviation of Protocol Configuration Options and corresponds to a container containing additional configuration information required to use the corresponding PDU Session and information exchanged between the UE 120 and the SMF 113. The SMF 113 may include an address of the DNS server 154 or the MEC configuration server 153 from the PCF 114 in the PCO. When the SMF 113 receives a list including a pair of the address of the DNS server 154 or the MEC configuration server 153 and the area (for example, tracking area list, cell list, or the like) in which the address value is available from the PCF 114, the SMF 113 may insert the list into the PCO and transmit the PCO to the UE 120. Alternatively, when the SMF 113 receives a list including a pair of the address of the DNS server 154 or the MEC configuration server 153 and the area (for example, tracking area list, cell list, or the like) in which the address value is available from the PCF 114, the SMF 113 may configure the address of the DNS server 154 or the MEC configuration server 153 according to the current location of the UE 120 as the PCO and transmit the PCO to the UE 120.

Alternatively, the SMF 113 may configure the PCO according to a pre-configured value in the SMF 113. When the information which the SMF 113 receives from the PCF 114 does not include information on the address of the DNS server 154 or the MEC configuration server 153 or regardless of a policy procedure with the PCF 114, the SMF 113 may insert the address of the DNS server 154 or the MEC configuration server 153 into the PCO provided to the UE 120 according to a pre-configured value. When the information pre-configured in the SMF 113 has a list including a pair of the address of the DNS server 154 or the MEC configuration server 153 and the area (for example, tracking area list, cell list, or the like) in which the address value is available, the SMF 113 may insert the list into the PCO and transmit the PCO to the UE 120. Alternatively, when there is a list including a pair of the address of the DNS server 154 or the MEC configuration server 153 and the area (for example, tracking area list, cell list, or the like) in which the address value is available in information preset in the SMF 113, the SMF 113 may configure the address of the DNS server 154 or the MEC configuration server 153 according to the current location of the UE 120 as the PCO and transmit the PCO to the UE 120.

The PCO may be included in a session management NAS message corresponding to PDU session establishment accept and transmit to the UE 120 as an NAS message through the AMF 112.

The SMF 113 may insert a PDU Session establish accept message transmitted to the UE 120 and an N2 message transmitted to the RAN 111 into an Namf_Communication_N1N2messageTransfer message and transmit the same to the AMF 112. The N2 message includes a PDU session ID, a QoS profile, a QoS flow ID, tunnel information on the side of the UPF 116 for an N3 tunnel connection of the RAN 111 with the UPF 116, and the like.

The AMF 112 may transmit ACK for the Namf_Communication_N1N2messageTransfer to the SMF 113.

In operation 340, the AMF 112 transmits the message received from the SMF 113 to the RAN 111. The message includes the N2 SM message received from the SMF 113 and the N1 SM NAS message received from the SMF 113.

In operation 345, the RAN 111 receives the message of operation 340 and performs an RRC signaling procedure for establishing a data radio bearer with the UE 120 according to QoS information included in the N2 SM message. Further, the RAN 111 transmits the received NAS message to the UE 120.

The UE 120 receiving the PDU session establishment accept message from the SMF 113 completes the PDU session establishment procedure. The UE 120 identifies PCO information included in the PDU Session establishment accept message and identifies the address of the DSN server 154 or the MEC configuration server 153 included in the PCO. Through the information, the UE 120 may know the DNS server 154 which the UE should access for the corresponding PDU session. Alternatively, when the UE 120 identifies the address of the MEC configuration server 153, the UE may know an address of a server which the UE should initially access for the corresponding PDU session. Identifying the information, the NAS layer of the UE 120 transmits the information to a higher layer (that is, enabling layer) 220 through an AT command. The AT command is a method of transmitting a command between the 3GPP communication Layer 230 and a higher layer (for example, the application layer 210, including the enabling layer 220 according to the structure of the disclosure) and indicates an operation of informing the higher layer of information required for using the network. The enabling layer 220 of the UE 120 may perform AT command connection registration with the NAS layer of the 3GPP communication layer 230 and may register a command of giving the address of the DNS server 154 or a command of giving the address of the MEC configuration server 153 therethrough. The NAS layer 230 of the UE 120 identifying the PCO of the SM NAS message through operation 345 transmits the address of the DNS server or the address of the MEC configuration server which the UE received through the PCO to the enabling layer 220 according to the registered AT command. The enabling layer 220 stores the information. When receiving the DNS server address through the AT command, the enabling layer 220 stores the DNS server address and then identifies the stored DNS server address if a DNS query is generated by an App using the corresponding DNN (that is, DNN for MEC) in the future and transmits the DNS query to the corresponding server 154. When the enabling layer 220 receives the MEC configuration server address through the AT command, the enabling layer 220 stores the MEC configuration server address and then uses the address to access the MEC configuration server 154 in order to be registered in the MEC service or receive required configuration information. When receiving a list including a pair of the address of the DNS server 153 or the MEC configuration server 153 and the area in which the address value is available (for example, tracking area list, cell list, or the like) through the PCO, the NAS layer 230 of the UE 120 may transmit the list to the enabling layer 220 through the AT command. The enabling layer 220 stores the information. In this case, the enabling layer identifies stored location information and a DNS server address corresponding thereto if a DNS query is generated by an App using the corresponding DNN (that is, DNN for MEC) in the future and transmits the DNS query to the corresponding server 154. When the enabling layer 220 receives the MEC configuration server address and the location information thereof through the AT command, the enabling layer stores the same and then identifies the MEC configuration server 153 corresponding to the current location of the UE 120 and accesses the corresponding server in order to be registered in the MEC service, receive required configuration information, or access the MEC configuration server 153.

In operation 350, the RAN 111 transmits a response to operation 340 to the AMF 112. The message includes the N2 SM message containing a PDU session ID and tunnel information on the side of the RAN for the N3 tunnel connection with the UPF. Further, the message may include information such as established QoS flow or the like.

The AMF 112 receiving the message in operation 350 may transmit the N2 SM message contained in the message of operation 350 to the SMF 113 in operation 355.

In operation 360, the SMF 113 may perform an N4 session modification procedure with the UPF 116 on the basis of the N2 SM message received in operation 355. At this time, the SMF 113 may transmit the N3 tunnel information on the size of the RAN received from the RAN 111 to the UPF 116 and also transmit a packet forwarding rule therefor. Through such an operation, the UPF 116 and the RAN 111 may determine that the tunnel connection for data transmission/reception has established.

In operation 365, the SMF 113 may transmit a response to operation 355 to the AMF 112.

Now, the UE 120 may perform data transmission and reception through the established PDU session.

Figure 4:
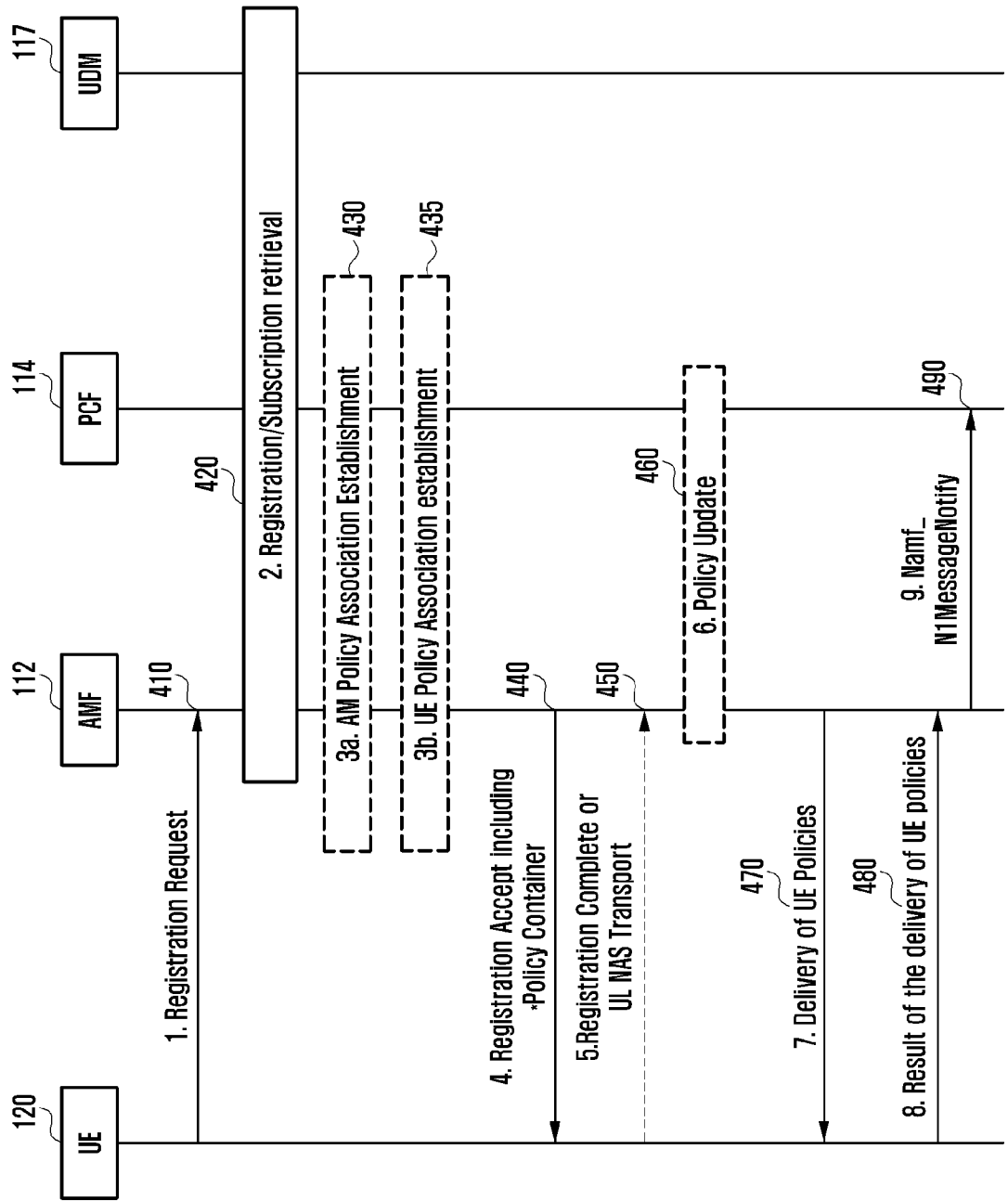
FIG. 4 illustrates a procedure in which the terminal registers a 5G mobile communication system according to an embodiment of the disclosure. The terminal may receive a policy including information on a server which the terminal should initially access through the procedure.

FIG. 4 illustrates a procedure in which the UE receives policy information from the 5G system after accessing the 5G system and performing a registration procedure according to an embodiment of the disclosure. The UE may receive a policy including information on a server which the UE should initially access through the procedure.

According to an embodiment of the disclosure, through the procedure of FIG. 4, a method by which the UE 120 acquires information on the DNS server 154 for discovering the edge server 151 which the UE 120 should access to use the MEC service from the 5G system is proposed. The DNS server 154 may resolve an IP address of the edge server 151 or may be used to resolve an IP address of an application server driven on the edge server 151. That is, the DNS server 154 may be a network function of knowing information on the edge server 151 or information on the application server driven on the edge server. The DNS server 154 may exist in every edge network covering a specific area or one DNS server may exist in the entire MEC system.

In operation 410, the UE 120 may perform a registration procedure in order to be registered in the 5G system. The UE 120 may perform the registration procedure when the UE initially accesses the 5G system, when the UE periodically informs the 5G system of its own reachability, when the UE 120 is located in another area and thus escapes a registration area received from the 5G system, when the UE desires to change a service to be used (for example, a change in a network slice or the like), or in order to make a request for policy information. After establishing the RRC connection with the RAN 111, the UE 120 may insert a registration request message corresponding to an NAS message transmitted to the AMF 112 into the RRC message and transmit the RRC message. According to a detailed embodiment of the disclosure, the UE 120 may insert an identifier (Network Slice Selection Assistance Information (NSSAI)) indicating a network slice for MEC into the registration request message and transmit the registration request. Alternatively, according to a detailed embodiment of the disclosure, the UE 120 may insert a NAS message (That is, UE STATE INDICATION message) making a request for a policy from the PCF 114 into the registration request message and transmit the registration request message. After determining to use the MEC service, the UE 120 may insert the policy for the MEC service into the UE STATE INDICATION message (that is, UE Policy Selection Identifier (UPSI)). According to an embodiment, the enabling layer 220 for the MEC service within the UE 120 may need policy information for MEC and make a request for the policy information to the NAS layer of the 3GPP layer 230, and the NAS layer may determine to make a request for the policy for the MEC service on the basis thereof and determine the UPSI. The UPSI information may be used to determine that the PCF 114 should provide the policy for the MEC service to the UE 120 in the following operation. Further, the UE 120 may insert an identifier (for example, Android, IOS, or the like) of an operating system executed in the UE 120 into the UE STATE INDICATION message. In addition, the UE 120 may include information for identifying a version of the operating system (for example, Android 9.0, IOS 12.1, or the like).

In operation 420, the AMF 112 may infer an AMF having previously served the UE 120 on the basis of an ID of the UE 120 contained in the registration request message transmitted by the UE 120. The AMF 112 determining that there is an AMF having previously served the UE 120 may make a request for context of the UE 120 to the corresponding AMF. After receiving the context of the UE 120, the AMF 112 stores the context and uses the same to manage the UE 120. According to an embodiment, the AMF 112 determining that the UE 120 initially accesses the 5G system may generate context for managing the UE 120. In order to inform the UDM 117 that the AMF 112 serves the corresponding UE 120, the AMF 112 may perform a registration procedure in the UDM 117 and also perform a procedure of acquiring subscription information of the corresponding UE 120.

When the UE 120 performs the initial registration procedure, the AMF 112 may perform an AM policy association establishment procedure to acquire policy information required to manage the corresponding UE 120 in operation 430. Alternatively, when the UE 120 transmitting the registration request is not the UE which the AMF 112 has served, policy information required to manage the corresponding UE 120 is not pre-stored, and thus the AMF 112 may perform an AM policy association update procedure with the PCF 114 in order to receive the policy information. Through the procedure, the AMF 112 may acquire policy information for managing access or mobility of the UE 120 and store the policy information in the context of the UE 120 to manage the UE 120.

When the UE 120 transmits the registration request message including a NAS message (that is, UE STATE INDICATION message) making a request for the policy from the PCF 114, and the UE 120 performs an initial registration procedure in the network or a serving AMF is changed due to mobility of the UE 120, the AMF 112 may perform a UE policy association establishment procedure with the PCF 114 in order to receive policy information of the corresponding UE 120 in operation 435. According to an embodiment, when there is the PCF 114 has previously established the UE policy association and the UE 120 has transmitted a NAS message (that is, UE STATE INDICATION message) making a request for the policy, the AMF 112 may transmit a UE policy update request to the PCF 114. The AMF 112 may inform the PCF 114 of the current location of the UE 120 through the procedure.

The AMF 112 may transmit the UE STATE INDICATION message corresponding to the NAS message for the policy received from the UE 120 to the PCF 114 through the registration procedure. The PCF 114 receiving the UE STATE INDICATION message identifies the UPSI within the UE STATE INDICATION message. When the UE 120 includes an identifier making a request for policy information for MEC as a UPSI value of the UE STATE INDICATION message in operation 410, the PCF 114 may determine that the UE 120 makes a request for policy information for using the MEC service. The PCF 114 may identify whether the UE 120 is a UE which can use the MEC service on the basis of subscription information. When the UE STATE INDICATION message transmitted by the UE 120 includes an ID of the operating system executed in the UE 120, the PCF 114 may identify the operating system used by the UE 120 on the basis of the information and configure policy information which can be applied to the corresponding operating system. For example, after determining whether MEC or a DNN for MEC can be used for a specific application in the Android OS, the PCF 114 may apply the determination when configuring the policy information. Further, when receiving the current location of the UE 120 from the AMF 112, the PCF 114 may determine policy information required for the MEC service according to the current location of the UE 120. Since the MEC service mainly aims at using the network close to a specific area, it is not required to provide information for the MEC service remote from the current location of the UE 120, and thus the PCF 114 may determine policy information required for the MEC service on the basis of the current location of the UE 120. Alternatively, regardless of the current location of the UE 120, the PCF 114 may determine to provide information for all MEC services which can be used by the UE 120 within a corresponding PLMN.

According to an embodiment of the disclosure, the PCF 114 may configure policy information to be provided to the UE 120 having made a request for policy information for the MEC service 1) in the type of a UE Route Selection Policy (URSP) or 2) in the type of an MEC policy.

1) The URSP is the abbreviation of a UE Route Selection Policy and corresponds to information indicating rules for an SSC mode to be used when the UE 120 performs data transmission and reception, a network slice to be used, a DNN to be used, a PDU session type (for example, IPv4, IPv6, or the like), an access type (for example, RAN, WiFi, or the like) to be used, an IP address to be used. The URSP includes a traffic descriptor and a route selection descriptor. The traffic descriptor may include an App ID, a destination IP 3 tuple (address, protocol ID, and port number), a destination FQDN, a DNN, a connection capability (ISM, MMS, Internet, or the like), and the like. After mapping of traffic transmitted by the application layer 210 of the UE 120 according to the traffic descriptor is determined, an SSC mode, network slice information, a DNN, a PDU session type (IPv4, IPv6, or the like), and an access type (3GPP or Non3GPP) may be applied for the connection to the PDU session. For example, when an application A of the UE 120 makes a request for traffic through any FQDN, a corresponding app ID and a traffic descriptor for a destination FQDN may be found and it may be determined which DNN should be used on the basis of a route selection descriptor for the traffic descriptor. According to an embodiment, for the UE 120 using the MEC service, the PCF 114 may additionally configure and apply information required for the MEC service to the URSP. In a method according to an embodiment of the disclosure, information required for the MEC service added to the URSP may include one or more pieces of the following information.

Information Added to [Traffic Descriptor]
Connection capability indicating that MEC service can be used
Application (OS ID+OS application ID) identifier supporting MEC
FQDN accessed to use MEC service
Location information list in which traffic descriptor is effective (for example, tracking area list, cell list, PLMN list, GPS information, or the like)
Time information in which traffic descriptor is effective (for example, Jan. 2, 2019 to Feb. 2, 2019, Mar. 4, 2019 to Mar. 4, 2020, time zone to which current UE belongs, UTC reference time information, or the like)
Information Added to [Route Selection Descriptor]
DNS server address or FQDN which UE 120 should access
DNS server address, location information list in which FQDN is effective (for example, tracking area list, cell list, PLMN list, GPS information, or the like), or effective time
MEC configuration server address or FQDN which UE 120 should access
MEC configuration server address, location information list in which FQDN is effective (for example, tracking area list, cell list, PLMN list, GPS information, or the like), or effective time When it is determined to use the MEC service by the traffic descriptor on the basis of the added information, the route selection descriptor is applied. The determination to use the MEC service by the traffic descriptor may mean that traffic requested by the application of the UE 120 is traffic using the DNN for MEC, information indicating that traffic requested by the application of the UE 120 is a connection using the MEC service is included in the connection capability, or the application requesting traffic is an application for using the MEC service.

According to an embodiment, when determining information on the DNS server 154 or the MEC configuration server 153, the PCF 114 may select a server for the MEC service having the smallest load or supporting a service area which is the closest to the current location of the UE 120 or includes the current location of the UE 120 in consideration of a load condition of the corresponding server.

2) In a method according to an embodiment of the disclosure, the PCF 114 may configure policy information for the MEC service in the form of the policy independent from the ANDSF, the URSP, or the like. In the disclosure, this may be called an MEC policy for convenience. The PCF 114 may configure information which the UE 120 should use for the MEC service in the MEC policy and transmit the MEC policy to the UE 120. Information included in the MEC policy may include one or more pieces of the following information.

Application (OS ID+OS application ID) identifier supporting MEC
FQDN accessed to use MEC service
Location information list in which MEC policy is effective (for example, tracking area list, cell list, PLMN list, GPS information, or the like)
Time information in which MEC policy is effective (for example, Jan. 2, 2019 to Feb. 2, 2019, Mar. 4, 2019 to Mar. 4, 2020, time zone to which current UE belongs, UTC reference time information, or the like)
DNS server address or FQDN which UE 120 should access
DNS server address, location information list in which FQDN is effective (for example, tracking area list, cell list, PLMN list, GPS information, or the like), or effective time
MEC configuration server address or FQDN which the UE 120 should access or address of server or FQDN which the UE 120 using MEC service should initially access
MEC configuration server or server address for initial access, or location information list in which FQDN is effective (for example, tracking area list, cell list, PLMN list, GPS information, or the like), or effective time According to an embodiment, when determining information on the DNS server 154 or the MEC configuration server 153, the PCF 114 may select a server for the MEC service having the smallest load or supporting a service area which is the closest to the current location of the UE 120 or includes the current location of the UE 120 in consideration of a load condition of the corresponding server.

The operation after the information is transmitted to the UE 120 is described below in detail. After configuring the policy information, the PCF 114 may insert the policy information into a NAS message corresponding to a MANAGE UE POLICY COMMAND and transmit the NAS message to the AMF 112. The AMF 112 may recognize the message as a container containing the policy information without analyzing the message. The AMF 112 may transmit the NAS message (that is, policy container) containing the policy information received from the PCF 114 to the UE 120 in operation 440.

In operation 440, the AMF 112 may transmit a registration accept message to the UE 120 in order to accept a registration procedure of the UE 120. When operation 435 is performed and the AMF 112 receives the policy container which should be transmitted to the UE 120 in operation 435 from the PCF 114, the AMF 112 may insert the policy container into the registration accept message and transmit the registration accept message to the UE 120.

The UE 120 may receive the registration accept message. When the registration accept message includes the policy container, for example, the MANAGE UE POLICY COMMAND which the PCF 114 transmits through the AMF 112, the UE 120 identifies the same and applies the same to the UE operation. A procedure in which the UE 120 applies the received information is described below.

When the UE 120 newly receives a Globally Unique Temporary Identifier (GUTI) through the registration accept message of operation 440, the UE 120 may transmit a registration complete message to the AMF 112 to complete the registration procedure in operation 450. According to an embodiment, when the UE 120 receives the MANAGE UE POLICY COMMAND message through the registration accept message of operation 440, the UE 120 may insert a MANAGE UE POLICY COMPLETE message indicating the MANAGE UE POLICY COMMAND has been well applied in the policy container and transmit the play container to the AMF 112. The AMF 112 may transmit the policy container to the PCF 114.

When the PCF 114 does not provide the policy information for using the MEC service to the UE 120 through operations 410 to 450, that is, when the UE 120 does not insert the UE STATE INDICATION message making a request for the policy information into the registration request message, the PCF 114 may know which UE 120 accesses the network according to the AM policy establishment procedure in operation 430. Accordingly, the PCF 114 may determine that the corresponding UE 120 is a UE using the MEC service on the basis of subscription information or user information and determine to provide the policy information required for the MEC service to the UE 120. Therefore, the PCF 114 may perform operation 460 in order to provide the policy information for the MEC service to the UE 120. According to an embodiment, the PCF 114 may perform operation 460 in order to update new policy information to the UE 120 even though the policy information for using the MEC service is provided to the UE 120 in operations 410 to 450.

In operation 460, the PCF 114 may perform a UE policy update procedure with the AMF 112 to provide the policy information to the UE 120. The operation is a procedure in which the PCF 114 configures the policy information which should be transmitted to the UE 120 through a NAS message and transmits the policy information in the form of a policy container to the AMF 112, and the AMF 112 may transmit the policy information received through the procedure to the UE 120 in the following operation.

After determining that the UE 120 is a UE using the MEC service on the basis of subscription information or user information stored in the PCF 114 or acquired from the UDR, the PCF 114 may configure the policy information for the MEC service according to the embodiment of the disclosure described in operation 435 for the corresponding UE 120.

According to an embodiment of the disclosure, the PCF 114 may configure the policy information to be provided to the UE 120 making a request for the policy information for the MEC service 1) in the type of the URSP or 2) in the type of the MEC policy.

1) The URSP is the abbreviation of a UE Route Selection Policy and corresponds to information indicating rules for an SSC mode to be used when the UE 120 performs data transmission and reception, a network slice to be used, a DNN to be used, a PDU session type (for example, IPv4, IPv6, or the like), an access type (for example, RAN, WiFi, or the like) to be used, an IP address to be used. The URSP includes a traffic descriptor and a route selection descriptor. The traffic descriptor may include an App ID, a destination IP 3 tuple (address, protocol ID, and port number), a destination FQDN, a DNN, a connection capability (ISM, MMS, Internet, or the like), and the like. After matching of traffic transmitted by the application layer 210 of the UE 120 is determined according to the traffic descriptor, an SSC mode included in the route selection descriptor, network slice information, a DNN, a PDU session type (IPv4, IPv6, or the like), an access type (3GPP or Non3GPP) may be applied and connected to the PDU session. For example, when an application A of the UE 120 makes a request for traffic through any FQDN, a corresponding app ID and a traffic descriptor for a destination FQDN may be found and it may be determined which DNN should be used on the basis of a route selection descriptor for the traffic descriptor. According to an embodiment, for the UE 120 using the MEC service, the PCF 114 may additionally configure and apply information required for the MEC service to the URSP. In a method according to an embodiment of the disclosure, information required for the MEC service added to the URSP may include one or more pieces of the following information.

Information Added to [Traffic Descriptor]
Connection capability indicating that MEC service can be used
Application (OS ID+OS application ID) identifier supporting MEC
FQDN accessed to use MEC service
Location information list in which traffic descriptor is effective (for example, tracking area list, cell list, PLMN list, GPS information, or the like)
Time information in which traffic descriptor is effective (for example, Jan. 2, 2019 to Feb. 2, 2019, Mar. 4, 2019 to Mar. 4, 2020, time zone to which current UE belongs, UTE reference time information, or the like)
Information Added to [Route Selection Descriptor]
DNS server address or FQDN which UE 120 should access
DNS server address, location information list in which FQDN is effective (for example, tracking area list, cell list, PLMN list, GPS information, or the like), or effective time
MEC configuration server address or FQDN which UE 120 should access
MEC configuration server address, location information list in which FQDN is effective (for example, tracking area list, cell list, PLMN list, GPS information, or the like), or effective time When it is determined to use the MEC service by the traffic descriptor on the basis of the added information, the route selection descriptor is applied. The determination to use the MEC service by the traffic descriptor may mean that traffic requested by the application of the UE 120 is traffic using the DNN for MEC, information indicating that traffic requested by the application of the UE 120 is a connection using the MEC service is included in the connection capability, or the application requesting traffic is an application for using the MEC service.

According to an embodiment, when determining information on the DNS server 154 or the MEC configuration server 153, the PCF 114 may select a server for the MEC service having the smallest load or supporting a service area which is the closest to the current location of the UE 120 or includes the current location of the UE 120 in consideration of a load condition of the corresponding server.

2) In a method according to an embodiment of the disclosure, the PCF 114 may configure policy information for the MEC service in the form of the policy independent from the ANDSF, the URSP, or the like. In the disclosure, this may be called an MEC policy for convenience. The PCF 114 may configure information which the UE 120 should use for the MEC service in the MEC policy and transmit the MEC policy to the UE 120. Information included in the MEC policy may include one or more pieces of the following information.

- Application (OS ID+OS application ID) identifier supporting MEC
- FQDN accessed to use MEC service
- Location information list in which MEC policy is effective (for example, tracking area list, cell list, PLMN list, GPS information, or the like)
- Time information in which MEC policy is effective (for example, Jan. 2, 2019 to Feb. 2, 2019, Mar. 4, 2019 to Mar. 4, 2020, time zone to which current UE belongs, UTC reference time information, or the like)
- DNS server address or FQDN which UE 120 should access
- DNS server address, location information list in which FQDN is effective (for example, tracking area list, cell list, PLMN list, GPS information, or the like), or effective time
- MEC configuration server address or FQDN which UE 120 should access or address of server or FQDN which UE 120 using MEC service should initially access
- MEC configuration server or server address for initial access, or location information list in which FQDN is effective (for example, tracking area list, cell list, PLMN list, GPS information, or the like), or effective time According to an embodiment, when determining information on the DNS server 154 or the MEC configuration server 153, the PCF 114 may select a server for the MEC service having the smallest load or supporting a service area which is the closest to the current location of the UE 120 or includes the current location of the UE 120 in consideration of a load condition of the corresponding server.

The operation after the information is transmitted to the UE 120 is described below in detail. After configuring the policy information, the PCF 114 may insert the policy information into a NAS message corresponding to a MANAGE UE POLICY COMMAND and transmit the NAS message to the AMF 112. The AMF 112 may recognize the message as a container containing the policy information without analyzing the message. The AMF 112 may transmit the NAS message (that is, policy container) containing the policy information received from the PCF 114 to the UE 120 in operation 470.

The PCF 114 may configure the address of the DNS server 154 or the address of the MEC configuration server 153 which can be accessed for each location in the form of a list and may not transmit the list to the UE 120. In this case, the PCF 114 may need to provide the address of the DNS server 154 or the address of the MEC configuration server 153 suitable for the corresponding location on the basis of the current location of the UE 120. Accordingly, the PCF 114 may configure a location monitoring event in the AMF 112 to detect a change in the location of the UE 120. The PCF 114 may configure information on an area of interest (that is, region of interest) and subscribe to the monitoring event in the AMF 112 in order to identify mobility of the UE 120 in units of specific areas. In this case, when the UE 120 escapes or enters the area of interest, the AMF 112 may inform the PCF 114 of the location of the UE 120 together with the escape or entry, and the PCF 114 may determine whether to update the policy for the MEC service to the UE 120 on the basis of the received location of the UE 120.

Since the UE 120 is still in the connected state after completing the registration, the AMF 112 may transmit the policy information received from the PCF 114 in operation 460 to the UE 120 through a NAS message in operation 470. The NAS message may include a MANAGE UE POLICY COMMAND message which the PCF 114 transmits to the UE 120.

The UE 120 may identify the NAS message of operation 470 received from the AMF 112 and, when the MANAGE UE POLICY COMMAND message is included therein, identify the same and apply the same to the UE operation in operation 480. The UE 120 may insert a MANAGE UE POLICY COMPLETE indicating that the MANAGE UE POLICY COMMAND message has been applied well into the policy container and transmit the policy container to the AMF 112 in operation 480. The AMF 112 may transmit the policy container to the PCF 114 in operation 490. A procedure in which the UE 120 applies the received policy information is described below.

When receiving the policy for using the MEC service from the PCF 114 according to an embodiment, the UE 120 may apply the policy to the UE operation. When the PCF 114 transmits the policy for using the MEC service to the UE 120 through an expansion of the URSP, the UE 120 may operate as follows. When receiving the URSP from the PCF 114, the NAS layer 230 of the UE 120 may transmit URSP information to a layer which serves to process the URSP of the UE 120. According to an embodiment, the NAS layer 230 of the UE 120 may transmit the information to the layer which processes the URSP through an AT command. The AT command is a method of transmitting a command between the 3GPP communication Layer 230 and a higher layer (for example, the application layer 210, including the enabling layer 220 or the URSP-processing layer according to the structure of the disclosure) and indicates an operation of informing the higher layer of information required for using the network. The URSP-processing layer or the enabling layer 220 of the UE 120 may perform AT command connection registration with the NAS layer of the 3GPP communication layer 230 and accordingly register a command of giving URSP information. The layer which serves to process the URSP of the UE 120 may apply the URSP information received from the NAS layer 230. The layer which serves to process the URSP of the UE 120 may determine whether a request from the enabling layer 220 or the application layer 210 includes a connection capability indicating that the MEC service can be used.

In order to use the MEC service, the UE 120 becomes aware of the DNS server 154 which the UE 120 should access through the URSP information. For example, when the application layer 210 or the enabling layer 220 of the UE 120 makes a request for a DNS resolution to any FQDN, a traffic descriptor that matches a corresponding app ID and a destination FQDN may be found and a DNS server 154 which should be accessed and to which a query should be transmitted may be determined on the basis of a route selection descriptor for the traffic descriptor. Further, when determining the matching traffic descriptor, the UE 120 may determine whether the current location of the UE 120 belongs to an effective location information list expressed in the traffic descriptor. Alternatively, the UE 120 may determine an address of the DNS server 154 corresponding thereto in consideration of the current location of the UE 120 as expressed in the route selection descriptor. Alternatively, the UE 120 may compare the effective time information expressed in the traffic descriptor with a time at which the DNS resolution is requested and, when the time corresponds to the effective time, determine to perform an operation according to the route selection descriptor. Alternatively, the UE 120 may determine an address of the DNS server 154 in which the current time is determined to be effective in consideration of the current time as expressed in the route selection descriptor.

Alternatively, when the UE 120 identifies the address of the MEC configuration server 153 (or address of a server which should be initially accessed) through the URSP, the UE 120 comes to know a server which should be accessed in order to use the MEC service. For example, the enabling layer 220 of the UE 120 may transmit a message to the corresponding server address by identifying information on the server in the URSP for initial access for the MEC service. Further, the UE 120 may determine whether the current location of the UE 120 belongs to an effective location information list expressed in the traffic descriptor. Alternatively, the UE 120 may determine an address of the MEC configuration server 153 corresponding thereto in consideration of the current location of the UE 120 as expressed in the route selection descriptor. Alternatively, the UE 120 may determine effective time information expressed in the traffic descriptor and, when the effective time information corresponds to the effective time, may determine to initially access the address of the MEC configuration server 153 configured according to the route selection descriptor. Alternatively, the UE 120 may determine an address of the MEC configuration server 153 in which the current time is determined to be effective in consideration of the current time as expressed in the route selection descriptor.

When the PCF 114 transmits the policy for using the MEC service to the UE 120 in the form of an MEC policy, the UE 120 may operate as follows. When receiving the MEC policy from the PCF 114, the NAS layer 230 of the UE 120 transmits the MEC policy to the layer 220 serving to perform MEC service enabling of the UE 120. That is, according to the disclosure, the NAS layer 230 of the UE 120 may transmit MEC policy information to the enabling layer 220. The NAS layer 230 of the UE 120 may transmit the information to the layer serving to handle the MEC policy through an AT command. The AT command is a method of transmitting a command between the 3GPP communication Layer 230 and a higher layer (for example, the application layer 210, including the enabling layer 220 according to the structure of the disclosure) and indicates an operation of informing the higher layer of information required for using the network. The enabling layer 220 of the UE 120 may perform AT command connection registration with the NAS layer of the 3GPP communication layer 230 and register a command of giving MEC policy information therethrough. The enabling layer 220 of the UE 120 applies the MEC policy information received from the NAS layer 230. The enabling layer 220 of the UE 120 may know an application which can use the MEC service and accordingly may determine whether to apply the MEC policy.

In order to use the MEC service, the UE 120 becomes aware of the DNS server 154 which the UE 120 should access through the MEC policy information. For example, when the application 210 or the enabling layer 220 of the UE 120 makes a request for a DNS resolution to any FQDN, the UE 120 may access any DNS server 154 on the basis of a corresponding app ID and a destination FQDN and determine whether to transmit a query. Further, the UE 120 may determine whether the current location of the UE 120 belongs to an effective location information list expressed in the MEC policy information in consideration of the current location of the UE 120. Alternatively, in consideration of the current location of the UE 120, the UE 120 may determine an address of the DNS server 154 corresponding thereto. Alternatively, the UE 120 may compare effective time information in the MEC policy information with a time at which the DNS resolution is requested and, when the time corresponds to the effective time, determine to transmit a DNS query to the corresponding DNS server 154. Alternatively, the UE 120 may determine an address of the DNS server 154 in which the current time is determined to be effective among information in the MEC policy information in consideration of the current time and transmit a DNS query.

Alternatively, when the UE 120 identifies the address of the MEC configuration server 153 (or address of a server which should be initially accessed) through the MEC policy information, the UE 120 comes to know a server which should be accessed in order to use the MEC service. For example, the enabling layer 220 of the UE 120 may transmit a message to the corresponding server address by identifying information on the server in the MEC policy information for initial access for the MEC service. Further, in consideration of the current location of the UE 120, the UE 120 may determine an address of the MEC configuration server 153 corresponding thereto. Alternatively, the UE 120 may determine whether the initial access corresponds to the effective time information in the MEC policy and, when the initial access corresponds to the effective time, determine to perform initial access to the address of the configured MEC configuration server 153.

Figure 5:
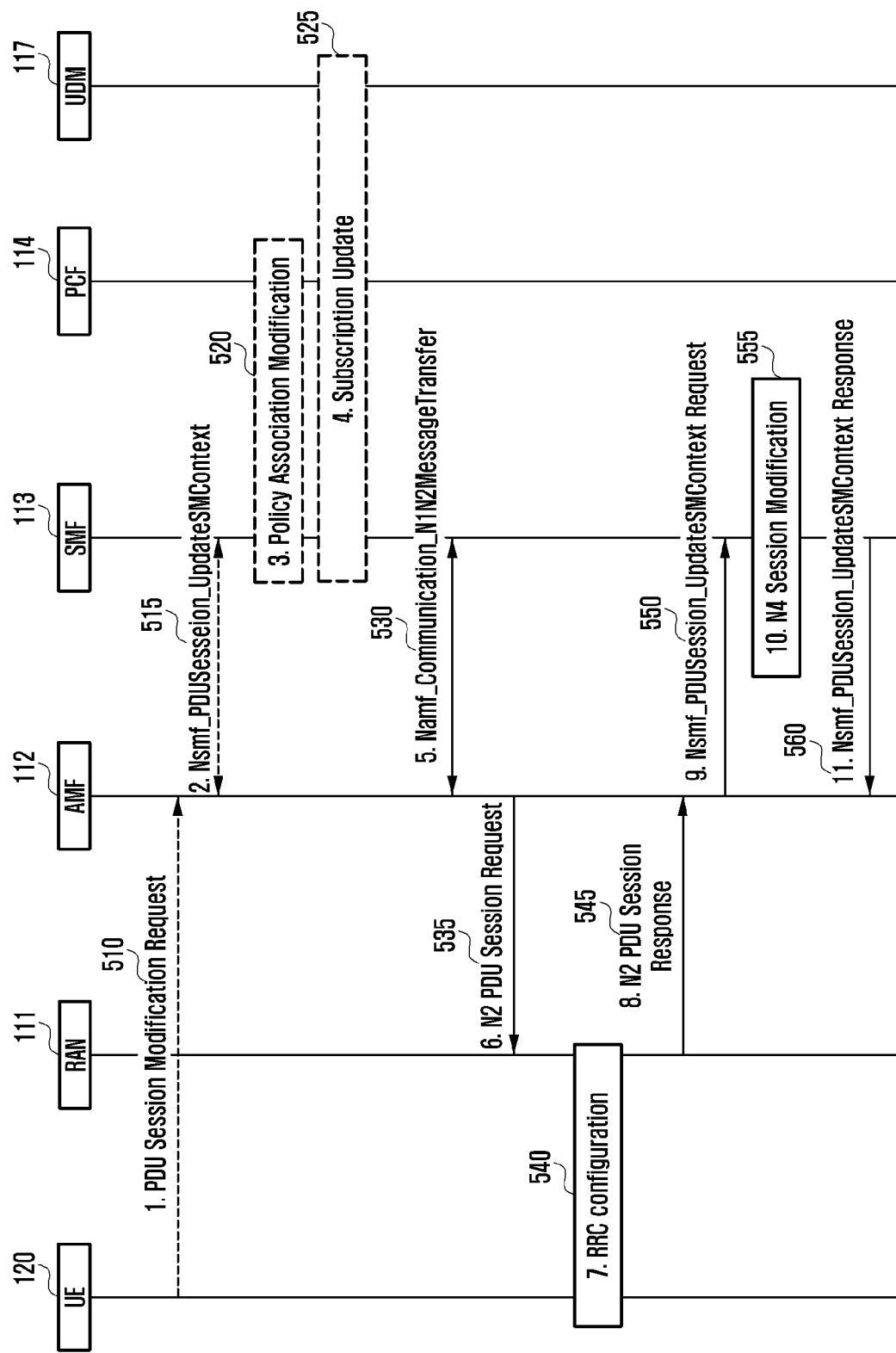
FIG. 5 illustrates a method in which the terminal uses a PDU session modification procedure to update information on a server which the terminal should initially access for an edge computing service to the terminal on the basis of mobility of the terminal or a change in information within the network according to an embodiment of the disclosure.

FIG. 5 illustrates a method of updating 'DNS server information for discovering an edge server which the UE should access to use the MEC service' or "MEC configuration server information which the UE should initially access to use the MEC service" in the UE through a PDU session modification procedure according to an embodiment of the disclosure.

Through the procedure of FIG. 5, the SMF 113 transmits updated PCO information to the UE 120. PCO information for the MEC service may follow the embodiment proposed in FIG. 3 of the disclosure.

The PDU session modification procedure may be performed under the following condition.

A change in the location of the UE 120: the SMF 113 determining the change in the location of the UE 120 may newly allocate the UPF 116 suitable for the current location of the UE 120 or trigger a PDU session modification procedure to transmit MEC service-related information effective at the current location of the UE 120. That is, the SMF 113 may trigger the PDU session modification procedure to provide an address of the DNS server 154 or an address of the MEC configuration server 153 which the UE 120 can use for the MEC service at the current location to the UE 120 through PCO. Alternatively, the PCF 114 determining the change in the location of the UE 120 may update SM policy association to transmit MEC service-related information effective at the current location of the UE 120 to the UE 120 and provide the MEC service-related information to the SMF 113, and thus the information can be transmitted to the UE 120 through the PDU session modification procedure. That is, after determining the current location of the UE 120, the PCF 114 may transmit the address of the DNS server 154 or the address of the MEC configuration server 153 which the UE 120 can use for the MEC service at the current location to the SMF 113 through an SM policy update procedure, and the SMF 113 may perform the PDU session modification procedure to provide the information to the UE 120 through PCO.

A change in subscription information of the UE 120: the UE 120 had not used the MEC service but has just subscribed to an additional service of a mobile communication service provider to use the MEC service, it may be determined that the mobile communication service provider should provide information required for using the MEC service to the UE 120. Accordingly, the UDM 117 may perform a subscription information update procedure with the SMF 113 and thus the SMF 113 may provide MEC service-related information, that is, information on the DNS server 154 or the MEC configuration server 153 which the UE 120 should access to use the MEC service to the UE 120 through the PDU session modification procedure. Alternatively, the PCF 114 may determine that a value for using the MEC service should be transmitted to the UE 120 on the basis of the changed subscription information of the UE 120 and provide MEC service-related information to the SMF 113 through an SM policy association update procedure. The SMF 113 receiving the MEC service-related information may perform the PDU session modification procedure to provide information on the DNS server 154 or the MEC configuration server 153 which the UE 120 should access to use the MEC service to the UE 120 through PCO. Inversely, when the UE 120 had used the MEC service but has just released an additional service of a mobile communication service provide not to use the MEC service any more, the mobile communication service provider may determine to update a PCC rule to the SMF 113 to prevent the UE 120 from using the MEC service or provide the updated PCO for invalidating the MEC service information which the UE 120 should use. For example, it may be determined to change the address of the DNS server 154 for using the MEC service into a DNS server address for a general Internet service. Accordingly, the SMF 113 may provide the updated PCO information through the PDU session modification procedure.

A request from a 3rd party: a request for providing the MEC service for a specific UE or DNN to the 5G system may be made to a service provider who provides the MEC service or a service provider who executes an application on the MEC service. This may be provided through a service level agreement or an OAM system. The mobile communication service provider receiving the request may determine to provide information required for using the MEC service to a UE using the corresponding DNN or the specific UE through the 5G system. Accordingly, the UDM 117 or the PCF 114 may update information on the UE 120 to information for using the MEC service and inform the SMF 113 of the update. That is, the UDM 117 may transmit the address of the DNS server 154 or the address of the MEC configuration server 153 which the UE 120 can use for the MEC service to the SMF 113. Alternatively, the PCF 114 may provide the address of the DNS server 154 or the address of the MEC configuration server 153 which the UE 120 can use for the MEC service to the SMF 113 as SM policy information for the PDU session used by the UE 120. Alternatively, the OAM system may inform the SMF 113 of the address of the DNS server 154 or the address of the MEC configuration server 153 required for providing the MEC service to a specific DNN. The UDM 117, the PCF 114, or the SMF 113 receiving information from the OAM system may perform a PDU session modification procedure to provide information required for using the MEC service, that is, the address of the DNS server 154 or the address of the MEC configuration server 153 to the UE 120. Alternatively, in order to change the connection of the PDU session used by the UE 120 into the edge network, the address of the DNS server 154 or the address of the MEC configuration server 153 that should be used for MEC may be transmitted through the PCO while the PDU session modification procedure is being performed.

A request of the UE 120: the UE 120 may transmit a PDU session modification request to the SMF 113 in order to receive information required for the MEC service through the PCO to use the MEC service. On the other hand, the UE 120 may inform the SMF 113 that the MEC service is not used any more in the corresponding PDU session through a PDU session modification request not to use the MEC service any more. The SMF 113 receiving the same may provide or release information for the MEC service and provide the same to the UE 120 through the PCO. A release method may be a method of omitting the corresponding value from the PCO or inserting another value (for example, DNS server for the Internet service) into the PCO.

In operation 510, the UE 120 may configure a PDU session modification request corresponding to an SM NAS message and transmit the same to the AMF 112 in order to modify a PDU session. The UE 120 may insert a Data Network Name (DNN) to be used by the UE into the PDU Session modification message, which may indicate a DNN for MEC. Further, the UE 120 may insert PCO information into the PDU session modification message, and an indicator making a request for information on the DNS server 154 or the MEC configuration server 153 for the MEC service may be inserted into the PCO. This may be used when the SMF 113 configures a corresponding value in the PCO.

In operation 515, the AMF 112 may select the SMF 113 and transmit an Nsmf_PDUSession_CreateSMContext request message to the selected SMF 113. The AMF 112 may insert the PDU session modification request message received from the UE 120 into the message and transmit the message to the SMF 113. After performing operation 510 and operation 515, the SMF 113 may perform an SM policy association modification procedure with the PCF 114 for the corresponding DNN on the basis of the PDU session modification request message received from the UE 120. Operation 520 may be performed even when operation 510 and operation 515 are not performed. Operation 520 is an operation performed to inform the SMF 113 of the updated policy information by the PCF 114. This may be performed when subscription information is changed or there is a request from a 3rd party among the above-listed conditions. Due to the procedure, the SMF 113 determining the update of information for the MEC service may update the PCO value and transmit the PCO value to the UE 120, in which case an SM NAS message corresponding to a PDU session modification command may be used. The message may be transmitted to the AMF 112 in operation 530, and the AMF 112 may transmit the message to the UE 120 via the RAN 111 in operation 535 and operation 540.

Operation 525 is an operation performed to inform the SMF 113 of the updated subscription information by the UDM 117. Operation 525 may be performed regardless of operation 520. Further, operation 525 may be performed regardless of operation 510 and operation 515. Due to the procedure, the SMF 113 determining that the MEC service can be provided to the corresponding UE 120 may update a value required for the MEC service (information on the DNS server 154 or information on the MEC configuration server 153) in the PCO value and transmit the same to the UE 120 in which case an SM NAS message corresponding to a PDU session modification command may be used. The message may be transmitted to the AMF 112 in operation 530, and the AMF 112 may transmit the message to the UE 120 in operation 535 and operation 540.

In operation 530, the SMF 113 may configure an N2 SM message to be transmitted to the RAN 111 on the basis of session-related policy information received from the PCF 114. Further, the SMF 113 may insert the PCO value determined through the procedure into a message (PDU session modification command) making a request for modifying the PDU session to the UE 120. The SMF 113 may transmit an Namf_Communication_N1N2messageTransfer message including the message to the AMF 112. The AMF 112 may transmit ACK for the Namf_Communication_N1N2messageTransfer to the SMF 113.

In operation 535, the AMF 112 may transmit the message received from the SMF 113 to the RAN 111. The message includes the N2 SM message received from the SMF 113 and the N1 SM NAS message received from the SMF 113.

In operation 540, the RAN 111 may receive the message of operation 535 from the AMF 112 and perform an RRC signaling procedure for establishing a data radio bearer with the UE 120 according to QoS information included in the N2 SM message. Further, the RAN 111 may transmit the received NAS message to the UE 120. The UE 120 identifies an N1 SM NAS message received from the SMF 113 and identifies a PCO included in the message. The UE 120 may use the address of the DNS server 154 or the information on the MEC configuration server 153 included in the PCO for the MEC service according to the embodiment of the disclosure illustrated in FIG. 3. The UE 120 may configure a PDU session modification complete message indicating completion of the PDU session modification procedure as the N1 SM NAS message and transmit the message to the SMF 113.

In operation 545, the RAN 111 may transmit a response to operation 540 to the SMF 113. The message may include an N2 SM message and, when the UE 120 configures and transmits the PDU session modification complete message as the N1 SM NAS message, may also include the N1 SM NAS message.

The AMF 112 receiving the message of operation 545 may transmit the N2 SM message and the N1 SM NAS message included in the message of operation 545 to the SMF 113 in operation 550.

In operation 555, the SMF 113 may perform an N4 session modification procedure with the UPF 117 on the basis of the N2 SM message received in operation 550. At this time, the SMF 113 may transmit the N3 tunnel information on the size of the RAN received from the RAN 111 to the UPF 117 and also transmit a packet forwarding rule therefor. In operation 560, the SMF 113 may transmit a message in response to operation 550 to the AMF 112.

Figure 6:
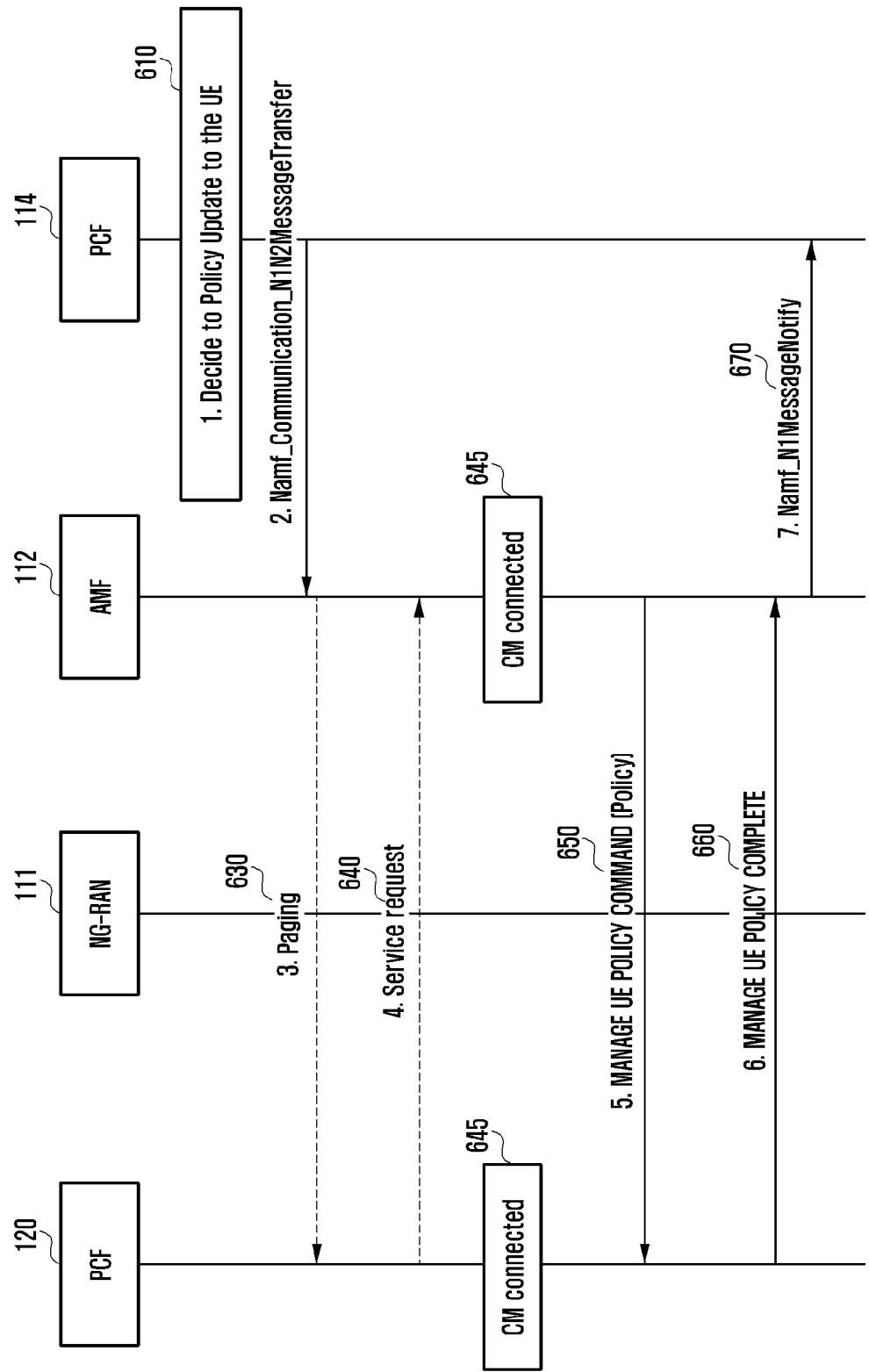
FIG. 6 illustrates a method in which the terminal uses a procedure of updating a policy to update information on a server which the terminal should initially access for an edge computing service to the terminal on the basis of mobility of the terminal or a change in information within the network according to an embodiment of the disclosure.

FIG. 6 illustrates a method of updating 'DNS server information for discovering an edge server which the UE should access to use the MEC service' or 'MEC configuration server information which the UE should initially access to use the MEC service' in the UE through a policy update procedure according to an embodiment of the disclosure.

The policy update procedure may be performed under the following condition.

A change in the location of the UE 120: the PCF 114 determining the change in the location of the UE 120 may perform a policy update procedure in order to transmit MEC service-related information effective at the current location of the UE 120. That is, after determining the current location of the UE 120, the PCF 114 may transmit the address of the DNS server 154 or the address of the MEC configuration server 153 that is the closest to the current location of the UE 120 to the UE 120 through the URSP or the MEC policy. Alternatively, after detecting the current location of the UE 120, the PCF 114 may transmit the address of the DNS server 154 or the address of the MEC configuration server 153 that supports the edge network to the UE 120 through the URSP or the MEC policy in order to allow the UE 120 to use the edge network that can be used at the current location of the UE 120. Alternatively, when determining the address of the DNS server 154 or the address of the MEC configuration server 153 that can be used at the current location of the UE 120, the PCF 114 may determine an optimal server in consideration of a load state of the corresponding server and determine a server of which an address is to be provided to the UE 120. The URSP or the MEC policy configured by the PCF 114 may follow the URSP or the MEC policy for the MEC service handled in the embodiment according to FIG. 4 of the disclosure.

A change in subscription information of the UE 120: when the UE 120 had not used the MEC service but has just subscribed to an additional service of a mobile communication service provider to use the MEC service, the mobile communication service provider may determine that information required for using the MEC service should be provided to the UE 120. Accordingly, the PCF 114 may receive an update of the subscription information from the UDR, and accordingly, may determine to provide MEC service-related information, that is, information on the DNS server 154 or information on the MEC configuration server 153 which the UE 120 should access to use the MEC service to the UE 120. The PCF 114 may configure the URSP or the MEC policy therefor, which may follow the URSP or the MEC policy for the MEC service handled in the embodiment according to FIG. 4 of the disclosure. On the other hand, when the UE 120 had used the MEC service but has just released an additional service of a mobile communication service provider to prevent the MEC service from being used, the mobile communication service provider is required to update policy information configured in the UE 120 in order to prevent the UE 120 from using the MEC service. For example, an operation of deactivating MEC-related information in the URSP or deactivating the MEC policy may be performed, and the UE 120 may be informed of the deactivation through the updated URSP or policy information. For example, the traffic descriptor and the route selection descriptor for using the MEC service may be removed and new traffic descriptor and route selection descriptor may be transmitted to the UE 120. Alternatively, the MEC policy information may be emptied and transmitted to the UE 120, and thus the UE 120 may be informed of the deactivation.

A request from a 3rd party: a request for providing the MEC service for a specific UE or a DNN to the 5G system may be made to a service provider who provides the MEC service or a service provider who executes an application on the MEC service. This may be provided through a service level agreement or an OAM system. The mobile communication service provider receiving the request may determine to provide information required for using the MEC service to a UE using the corresponding DNN or the specific UE through the 5G system. Accordingly, the PCF 114 may update the policy information for the UE 120 to information which can use the MEC service, configure the same as the URSP or the MEC policy, and transmit the URSP or the MEC policy to the UE 120. Alternatively, the OAM system may inform the PCF 114 of the address of the DNS server 154 or the address of the MEC configuration server 153 required for providing the MEC service to the specific UE 120. The PCF 114 receiving the information from the OAM system may perform a policy update procedure to provide information required for using the MEC service, that is, the URSP or the MEC policy to the UE 120 proposed in the embodiment of FIG. 4 according to the disclosure.

Operation 610 is a procedure in which the PCF 114 determines a policy update according to the above conditions.

In operation 620, the PCF 114 may configure a NAS message for the policy corresponding to a MANAGE UE POLICY COMMAND message and transmit the NAS message to the AMF 112 in order to transmit the updated policy to the UE 120. The AMF 112 cannot analyze the message but can determine the UE 120 to which the NAS message for the policy should be transmitted.

When the UE 120 is in a CM-IDLE state, the AMF 112 may page the UE to transmit the NAS message for the policy to the UE 120 in operation 630. When the UE 120 is already in a CM-connected state in operation 645, the AMF 112 may transmit the NAS message for the policy received from the PCF 114 to the UE 120 in operation 650.

When the UE 120 is in a CM-IDLE state, the AMF 112 may page the UE 120 to transmit the NAS message for the policy to the UE 120 in operation 630. In operation 645, the UE 1202 receiving the message may transition to a CM-connected state by performing a service request procedure in operation 340.

Since the UE 120 transitioned to the CM-connected state, the AMF 112 may transmit the NAS message for the policy received from the PCF 114, that is, that is, a MANAGE UE POLICY COMMAND to the UE 120 in operation 650. The message may include the URSP or the MEC policy information configured by the PCF 114 in operation 610. The information in the URSP or the MEC policy according to the present embodiment may follow the embodiment of FIG. 4. In operation 650, the UE 120 receiving the URSP or the MEC policy may apply the same to the internal operation. A method by which the UE 120 applies the same may follow the embodiment of FIG. 4.

In operation 660, the UE 120 may configure the NAS message for the policy which is a MANAGE UE POLICY COMPLETE in order to transmit a response indicating that the policy information has been applied well to the PCF 114 and transmit the same to the AMF 112. The AMF 112 may transmit the same to the PCF 114 in operation 670 and the PCF 114 may know that the UE 120 has received and applied the policy well.

Figure 7:
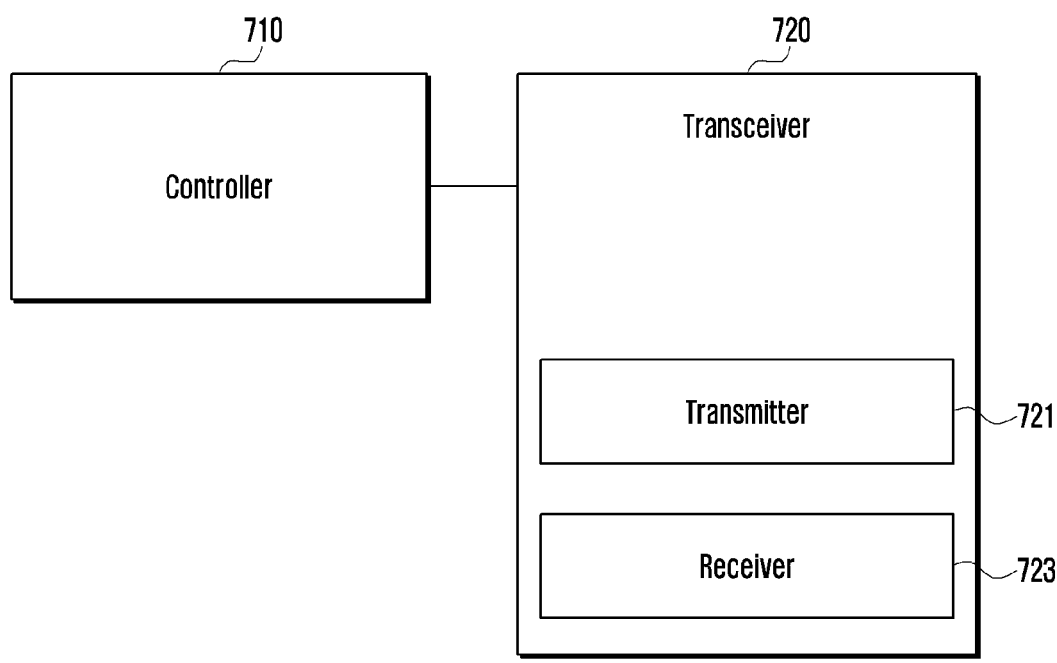
FIG. 7 is a block diagram illustrating the terminal according to an embodiment of the disclosure.

FIG. 7 is a diagram illustrating a configuration of a UE according to the disclosure.

The UE 120 according to an embodiment of the disclosure may include a transceiver 720 and a controller 710 that controls the overall operation of the UE 120. The transceiver 720 may include a transmitter 721 and a receiver 723.

The transceiver 720 may transmit and receive signals to and from other network entities.

The controller 710 may control the UE 120 to perform one operation in the above-described embodiments. Meanwhile, the controller 710 and the transceiver 720 do not have to be implemented as separated modules but may be implemented as one element such as a single chip. The controller 710 and the transceiver 720 may be electrically connected. For example, the controller 710 may be a circuit, an application-specific circuit, or at least one processor. Further, the operations of the UE 120 may be performed by including a memory device storing a corresponding program code in a predetermined element within the UE.

Figure 8:
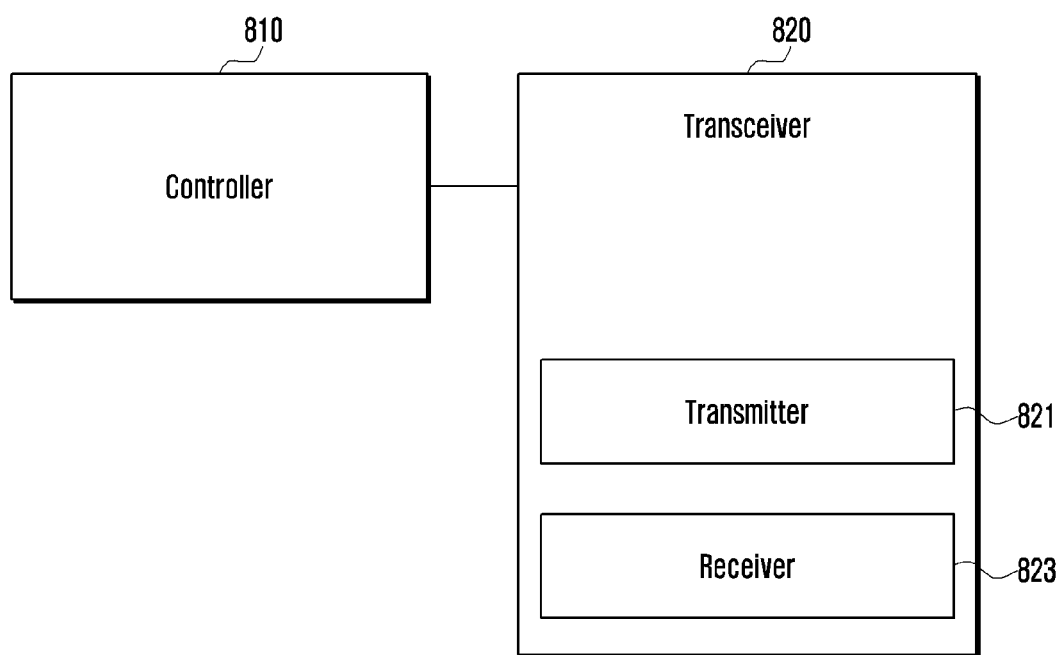
FIG. 8 is a block diagram illustrating a network entity according to an embodiment of the disclosure.

FIG. 8 is a diagram illustrating a configuration of a network entity according to the disclosure.

The network entity according to an embodiment of the disclosure may include a transceiver 820 and a controller 810 that controls the overall operation of the network entity. The transceiver 820 may include a transmitter 821 and a receiver 823.

The transceiver 820 may transmit and receive signals to and from other network entities.

The controller 810 may control the network entity to perform one operation in the above-described embodiments. Meanwhile, the controller 810 and the transceiver 820 do not have be implemented as separated modules but may be implemented as one element such as a single chip. The controller 810 and the transceiver 820 may be electrically connected. For example, the controller 810 may be a circuit, an application-specific circuit, or at least one processor. Further, the operations of the network entity may be performed by including a memory device storing a corresponding program code in a predetermined element within the network entity.

The network entity may be one of the RAN 111, the AMF 112, the SMF 113, the UPF 116, the PCF 114, the UDM 117, the UDR, the edge server 151, the configuration server 153, and the DNS server 154.

It should be noted that the block diagrams, example diagrams of a control/data signal transmission method, example diagrams of an operation procedure, and diagrams illustrated in FIGS. 1 to 8 have no intent to limit the scope of the disclosure. That is, it should not be construed that all element parts, entities, or operations shown in FIGS. 1 to 8 are essential elements for implementing the disclosure, and it should be understood that only a few elements may implement the disclosure within the scope without departing the subject matter of the disclosure.

The operations of the base station or the UE may be performed when a predetermined element within the base station or the UE apparatus includes a memory device storing the corresponding program code. That is, the controller of the base station or the UE apparatus may perform the operations by reading and executing the program code stored in the memory device through a processor or a Central Processing Unit (CPU).

Various elements and modules of the entity, the base station, or the UE used in the specification may operate by using a hardware circuit, for example, a combination of a complementary metal oxide semiconductor-based logical circuit, firmware, software and/or hardware, or a combination of firmware and/or software inserted into a machine-readable medium. For example, various electrical structures and methods may be performed using transistors, logic gates, and electrical circuits such as application specific integrated circuit.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a terminal in a wireless communication system, the method comprising:
   transmitting, to a session management function (SMF) via an access and mobility management function (AMF), a first message for requesting an establishment of a protocol data unit (PDU) session, the first message including information indicating a request for an edge computing service of the PDU session; and
   receiving, from the SMF, a second message including information on a configuration server for the terminal to receive configuration information on the edge computing service and information indicating whether the terminal is authorized to use the edge computing service for the PDU session.

2. The method of claim 1, wherein the first message is a PDU session establishment request message.

3. The method of claim 1, wherein the information on the configuration server and the information indicating whether the terminal is authorized to use the edge computing service are received through protocol configuration options (PCO).

4. The method of claim 1, wherein the information on the configuration server is determined based on at least one of information on a location of the terminal or subscription information of the terminal, and
   wherein the second message further includes information on a domain name system (DNS) server for the terminal to transmit a DNS query.

5. A terminal in a wireless communication system, the terminal comprising:
   a transceiver; and
   a controller configured to:
      transmit, to a session management function (SMF) via an access and mobility management function (AMF), a first message for requesting an establishment of a protocol data unit (PDU) session, the first message including information indicating a request for an edge computing service of the PDU session, and
      receive, from the SMF, a second message including information on a configuration server for the terminal to receive configuration information on the edge computing service and information indicating whether the terminal is authorized to use the edge computing service for the PDU session.

6. The terminal of claim 5, wherein the first message is a PDU session establishment request message.

7. The terminal of claim 5, wherein the information on the configuration server and the information indicating whether the terminal is authorized to use the edge computing service are received through protocol configuration options (PCO).

8. The terminal of claim 5, wherein the information on the configuration server is determined based on at least one of information on a location of the terminal or subscription information of the terminal, and
   wherein the second message further includes information on a domain name system (DNS) server for the terminal to transmit a DNS query.

9. A method performed by a session management function (SMF) in a wireless communication system, the method comprising:
   receiving, from a terminal, a first message for requesting an establishment of a protocol data unit (PDU) session, the first message including information indicating a request for an edge computing service of the PDU session;
   transmitting, to a core network entity, a second message for retrieving subscription information of the terminal for a session management;
   receiving, from the core network entity, a third message including the subscription information of the terminal for the session management, the subscription information comprises information on a configuration server for the terminal to receive configuration information on the edge computing service and information indicating whether the terminal is authorized to use the edge computing service for the PDU session; and
   transmitting, to the terminal, a fourth message including the information on the configuration server and the information indicating whether the terminal is authorized to use the edge computing service for the PDU session.

10. The method of claim 9, wherein the first message is a PDU session establishment request message.

11. The method of claim 9, wherein the fourth message includes protocol configuration options (PCO) including the information on the configuration server and the information indicating whether the terminal is authorized to use the edge computing service.

12. The method of claim 9, wherein the information on the configuration server is determined based on at least one of information on a location of the terminal or the subscription information of the terminal, and
   wherein the fourth message further includes information on a domain name system (DNS) server for the terminal to transmit a DNS query.

13. A session management function (SMF) in a wireless communication system, the SMF comprising:
   a transceiver; and
   a controller configured to:
      receive, from a terminal, a first message for requesting an establishment of a protocol data unit (PDU) session, the first message including information indicating a request for an edge computing service of the PDU session,
      transmit, to a core network entity, a second message for retrieving subscription information of the terminal for a session management,
      receive, from the core network entity, a third message including the subscription information of the terminal for the session management, the subscription information comprises information on a configuration server for the terminal to receive configuration information on the edge computing service configured and information indicating whether the terminal is authorized to use the edge computing service for the PDU session, and
      transmit, to the terminal, a fourth message including the information on the configuration server and the information indicating whether the terminal is authorized to use the edge computing service for the PDU session.

14. The SMF of claim 13, wherein the first message is a PDU session establishment request message, and
   wherein the fourth message includes protocol configuration options (PCO) including the information on the configuration server and the information indicating whether the terminal is authorized to use the edge computing service.

15. The SMF of claim 13, wherein the information on the configuration server is determined based on at least one of information on a location of the terminal or the subscription information of the terminal, and
   wherein the fourth message further includes information on a domain name system (DNS) server for the terminal to transmit a DNS query.

* * * * *